(12) United States Patent
Bims

(10) Patent No.: US 12,321,949 B2
(45) Date of Patent: Jun. 3, 2025

(54) LIGHT-BASED DATA ENTRY FOR PERSONAL INVENTORY AND PRODUCT SUPPORT SYSTEM

(71) Applicant: PROTOCOMM SYSTEMS, LLC, Menlo Park, CA (US)

(72) Inventor: Harry Bims, Menlo Park, CA (US)

(73) Assignee: PROTOCOMM SYSTEMS, LLC, Menlo Park, CA (US)

( * ) Notice: Subject to any disclaimer, the term of this patent is extended or adjusted under 35 U.S.C. 154(b) by 35 days.

(21) Appl. No.: 18/348,397

(22) Filed: Jul. 7, 2023

(65) Prior Publication Data

US 2023/0351405 A1 Nov. 2, 2023

Related U.S. Application Data

(60) Division of application No. 16/450,806, filed on Jun. 24, 2019, now Pat. No. 11,748,764, which is a continuation of application No. 14/754,314, filed on Jun. 29, 2015, now Pat. No. 10,332,121, which is a continuation-in-part of application No. 14/322,857, filed on Jul. 2, 2014, now Pat. No. 9,978,037.

(51) Int. Cl.
*G06Q 30/016* (2023.01)
*G09C 1/00* (2006.01)
*H04N 23/661* (2023.01)
*H04N 23/74* (2023.01)

(52) U.S. Cl.
CPC .......... *G06Q 30/016* (2013.01); *G09C 1/00* (2013.01); *H04N 23/661* (2023.01); *H04N 23/74* (2023.01)

(58) Field of Classification Search
None
See application file for complete search history.

(56) References Cited

U.S. PATENT DOCUMENTS

| 4,977,394 | A | * | 12/1990 | Manson | ............. | G05B 23/0286 68/12.27 |
|---|---|---|---|---|---|---|
| 6,851,611 | B1 | | 2/2005 | Shaw-Sinclair | | |
| 6,974,078 | B1 | | 12/2005 | Simon | | |
| 2005/0174235 | A1 | | 8/2005 | Davis et al. | | |
| 2007/0100829 | A1 | | 5/2007 | Allen et al. | | |
| 2009/0160735 | A1 | | 6/2009 | Mack | | |

(Continued)

OTHER PUBLICATIONS

Rajagopal, IEEE802.15.7 Visible Light Communication:Modulation Schemes and Dimming Support ,Mar. 2012, IEEE, IEEE Communications Magazine , Mar. 2012,72-82.*

*Primary Examiner* — Sarah M Monfeldt
*Assistant Examiner* — Donald J Edmonds
(74) *Attorney, Agent, or Firm* — Womble Bond Dickinson (US) LLP

(57) ABSTRACT

A method and apparatus for light-based data communication for a personal inventory and product support system are described. In one embodiment, the method comprises using a device associated with a user, including capturing visible light carrying data identifying a product, obtaining the data identifying the product from the captured visible light, configuring the device to receive product support content for the product based on the identifying data, the product support content having been curated from a plurality of content servers on behalf of the user, receiving a notification that curated product support content for the product is available, and presenting the curated product support content to the user.

20 Claims, 25 Drawing Sheets

(56) References Cited

U.S. PATENT DOCUMENTS

| | | |
|---|---|---|
| 2009/0250512 A1 | 10/2009 | Deck |
| 2010/0072280 A1 | 3/2010 | McGill |
| 2010/0223372 A1* | 9/2010 | Nichols .............. G06F 11/2294 709/223 |
| 2011/0022358 A1 | 1/2011 | Han |
| 2011/0153605 A1 | 6/2011 | Silverman |
| 2011/0161091 A1 | 6/2011 | Freishtat |
| 2012/0030032 A1 | 2/2012 | Zurada |
| 2012/0117115 A1 | 5/2012 | Convertino |
| 2012/0166241 A1 | 6/2012 | Livingston |
| 2012/0187184 A1 | 7/2012 | Challa |
| 2012/0261465 A1 | 10/2012 | Vasquez et al. |
| 2012/0303323 A1* | 11/2012 | Ha .......................... D06F 34/32 702/183 |
| 2013/0036061 A1 | 2/2013 | Alexander |
| 2013/0048721 A1 | 2/2013 | Rasband |
| 2013/0060359 A1 | 3/2013 | Kim et al. |
| 2013/0117187 A1 | 5/2013 | Small |
| 2013/0134213 A1 | 5/2013 | Pallakoff |
| 2013/0185143 A1 | 7/2013 | Damman |
| 2013/0185198 A1 | 7/2013 | Lorch |
| 2013/0188046 A1* | 7/2013 | Kong ..................... G08B 21/18 348/143 |
| 2013/0215238 A1 | 8/2013 | Yamazaki |
| 2014/0016016 A1 | 1/2014 | Berestov |
| 2014/0089142 A1 | 3/2014 | Jackovin |
| 2014/0139705 A1 | 5/2014 | Ebe |
| 2014/0146201 A1 | 5/2014 | Knight |
| 2014/0170969 A1* | 6/2014 | DeVos .................... G06F 16/00 235/375 |
| 2014/0278862 A1 | 9/2014 | Muppala |
| 2014/0279068 A1 | 9/2014 | Systrom |
| 2014/0280079 A1 | 9/2014 | Jain |
| 2015/0112988 A1 | 4/2015 | Pereira |
| 2015/0120389 A1 | 4/2015 | Zhang |
| 2016/0086234 A1 | 3/2016 | Boggie |

\* cited by examiner

```
┌─────────────────────────────────────────────────┐
│ CAPTURE, BY THE CAMERA OF THE CLIENT, THE VISIBLE LIGHT │
│ CONTAINING DATA IDENTIFYING A PRODUCT, TRANSMITTED BY THE │
│               PRODUCT ITSELF                     │
│                    611                           │
└─────────────────────────────────────────────────┘
                        │
┌─────────────────────────────────────────────────┐
│      OBTAIN THE DATA IDENTIFYING THE PRODUCT     │
│         FROM THE CAPTURED VISIBLE LIGHT          │
│                    612                           │
└─────────────────────────────────────────────────┘
                        │
┌─────────────────────────────────────────────────┐
│       NOTIFY THE SERVER ABOUT THE NEW PRODUCT    │
│                    613                           │
└─────────────────────────────────────────────────┘
                        │
┌─────────────────────────────────────────────────┐
│           CONFIGURE THE DEVICE TO RECEIVE        │
│     PRODUCT SUPPORT CONTENT FOR THE PRODUCT      │
│                    614                           │
└─────────────────────────────────────────────────┘
                        │
┌─────────────────────────────────────────────────┐
│    RECEIVE A NOTIFICATION (EITHER WIRELESSLY OR VIA │
│      WIRED COMMUNICATION) THAT CURATED PRODUCT   │
│      SUPPORT CONTENT IS AVAILABLE FOR THE PRODUCT│
│                    615                           │
└─────────────────────────────────────────────────┘
                        │
┌─────────────────────────────────────────────────┐
│ DISPLAY THE CURATED PRODUCT SUPPORT INFORMATION ON A │
│          DISPLAY SCREEN OF THE DEVICE            │
│                    616                           │
└─────────────────────────────────────────────────┘
```

Fig. 6B

600 - CURATED PRODUCT SUPPORT SERVER PROCESS FLOW

RECEIVE NOTIFICATION TO ADD A NEW ASSET TO THE USER INVENTORY DATABASE DIRECTLY FROM A USER BASED ON THE CAPTURE, VIA THE USER DEVICE, OF VISIBLE LIGHT FROM THE NEW ASSET (OR THROUGH THIRD PARTY IN RESPONSE TO ASSET ACQUISITION)
622

↓

OBTAIN ASSET DETAIL DATA FOR THE NEW ASSET AND ADD TO USER INVENTORY DATABASE
624

↓

OBTAIN CURATED PRODUCT SUPPORT CONTENT FOR THE NEW PRODUCT AND MAKE ACCESSIBLE TO USER IN CONNECTION WITH USER/PRODUCT INVENTORY DATABASE
626

↓

SERVE CURATED PRODUCT SUPORT CONTENT UPON USER DEMAND TO USER DEVICE IN CONJUNCTION WITH PERSONAL INVENTORY/PRODUCT SUPPORT APP
628

↓

RELINQUISH CONTROL TO THIRD PARTY?
630

NO → (loop back to 628)
YES ↓

LAUNCH THIRD PARTY APP/SERVICE TO ACCESS CURATED PRODUCT SUPPORT
632

Fig. 6C

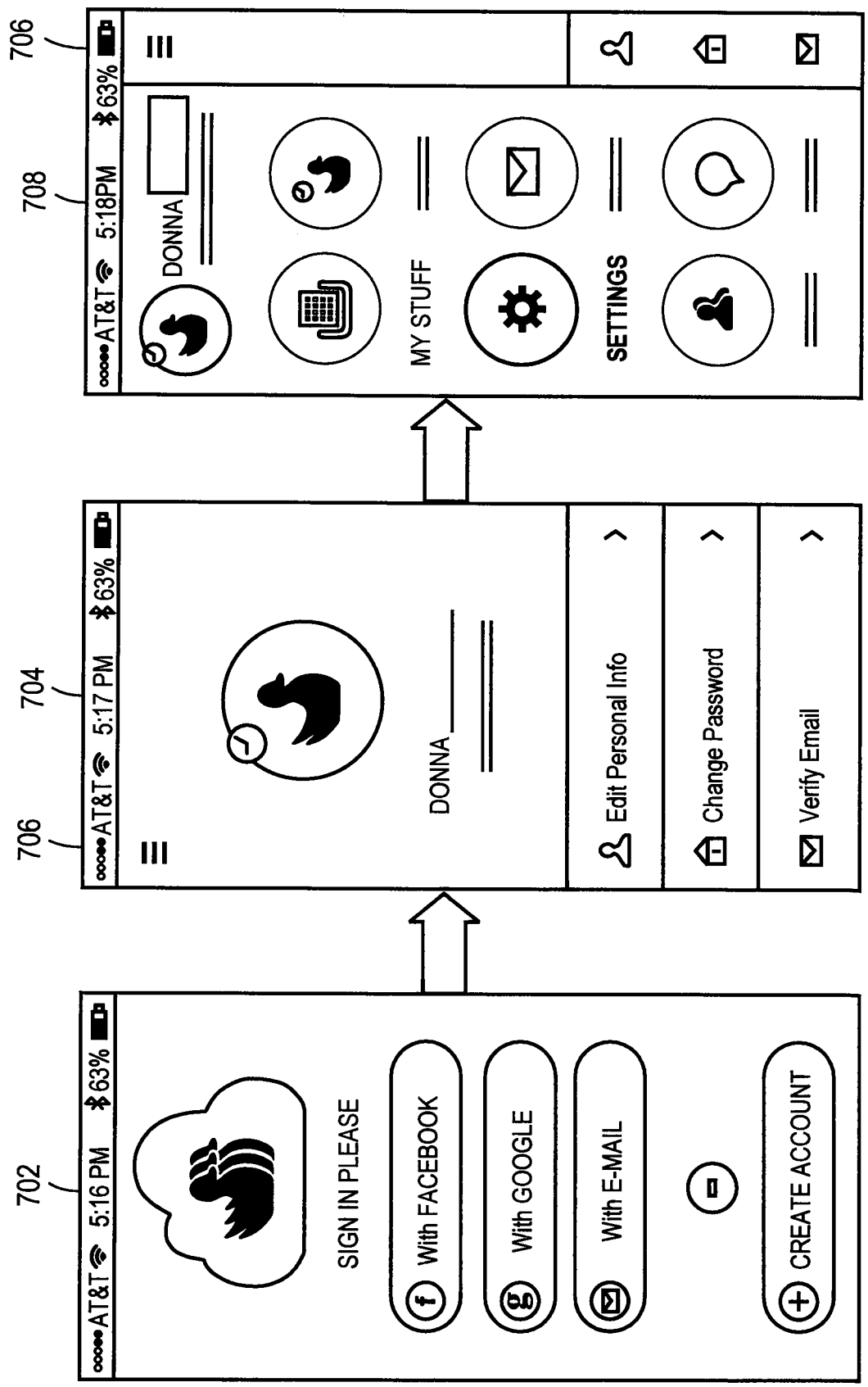

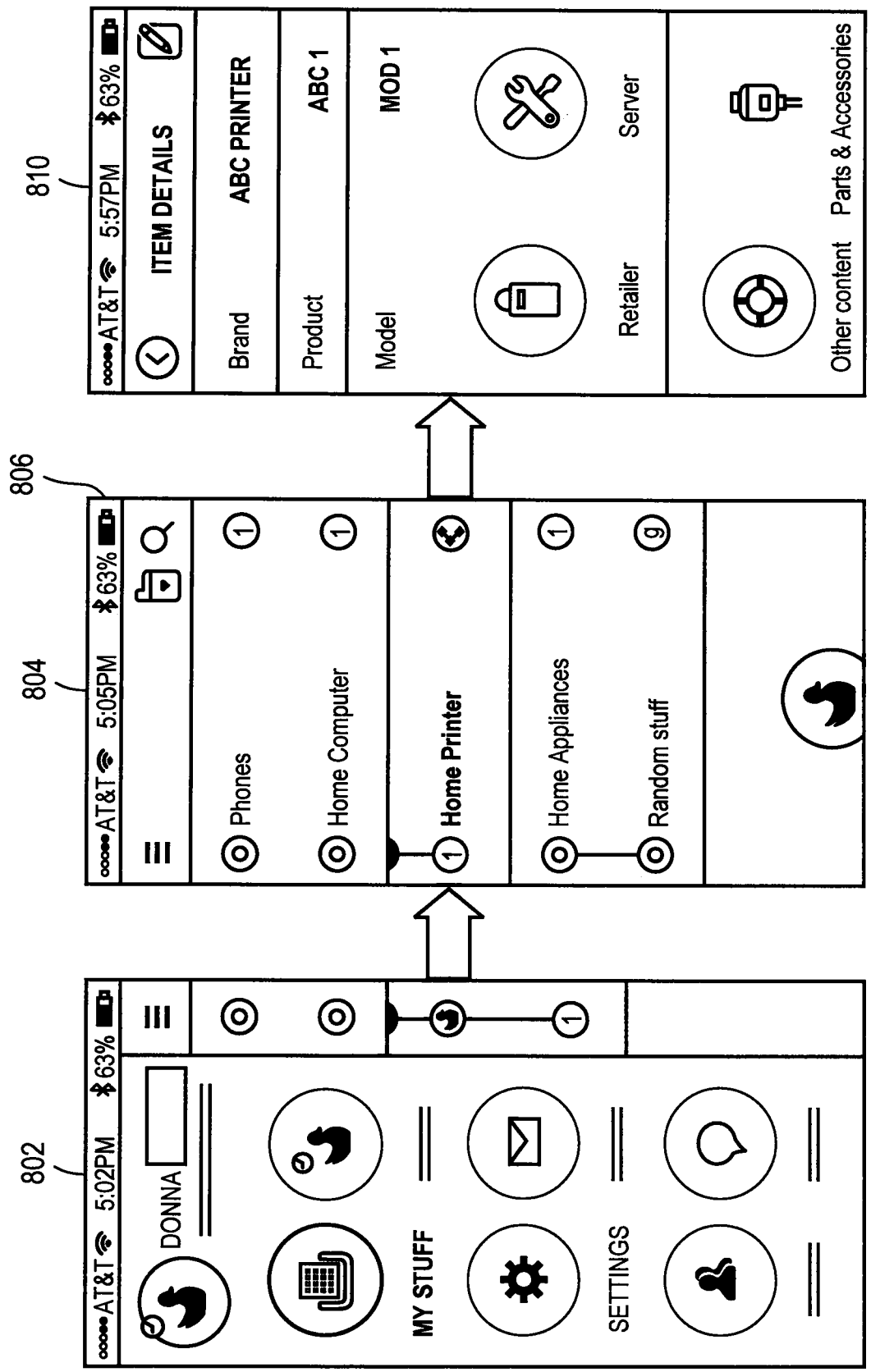

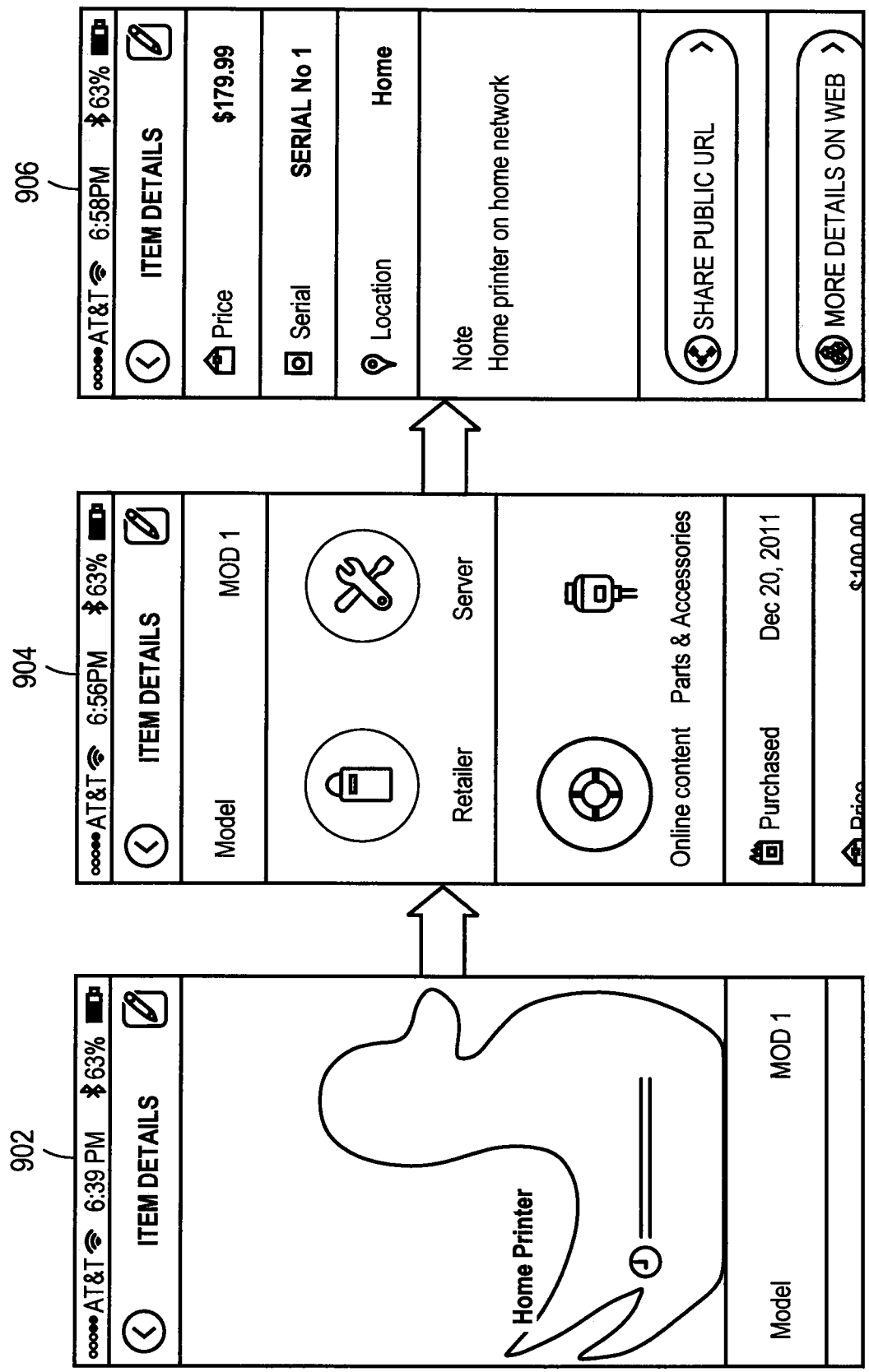

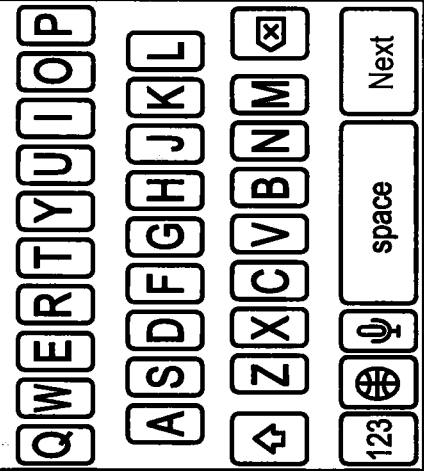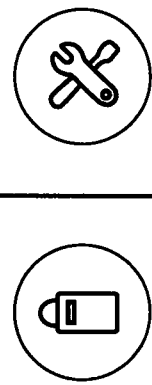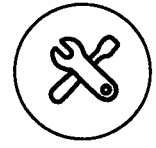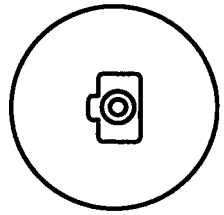
Fig. 11A  Fig. 11B  Fig. 11C

Personal Inventory Report
As of May 20, 2014

Title
Donna's iPhone
Brand
Apple
Product
iPhone 4S (Black 18GB AT&T)
Model
MC918LL/A

Purchase date
Dec 20 2011
Purchase price
$199.99
Serial number
—
Location
—

Title
Convection Oven
Brand
Oster
Product
—
Model
—

Purchase date
Dec 21 2013
Purchase price
—
Serial number
—
Location
Home

Title
Home Printer
Brand
ABC Brand
Product
ABC Printer
Model
MOD 1

Purchase date
May 13 2013
Purchase price
$179.99
Serial number
Serial No. 1
Location
Home

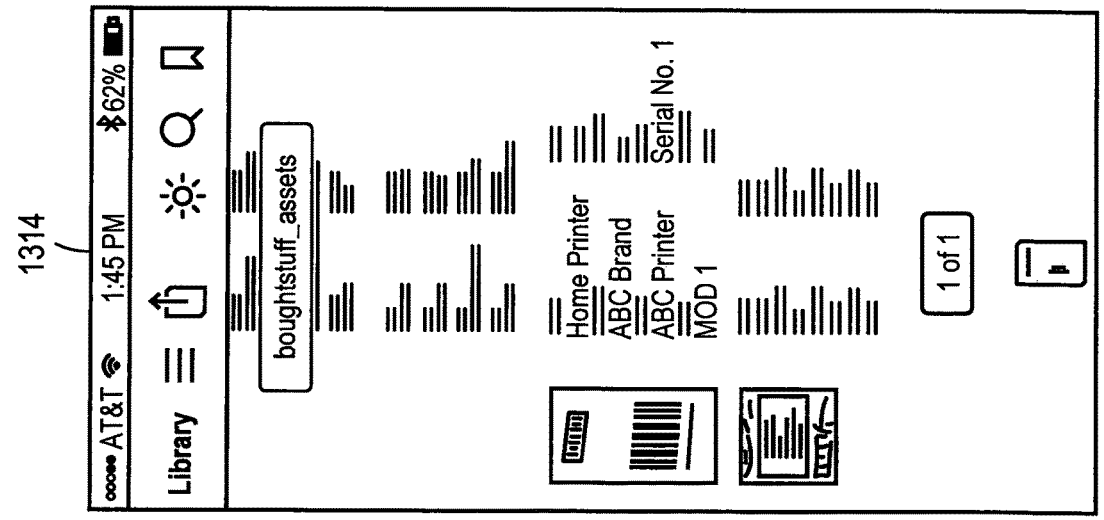
Fig. 13B.3
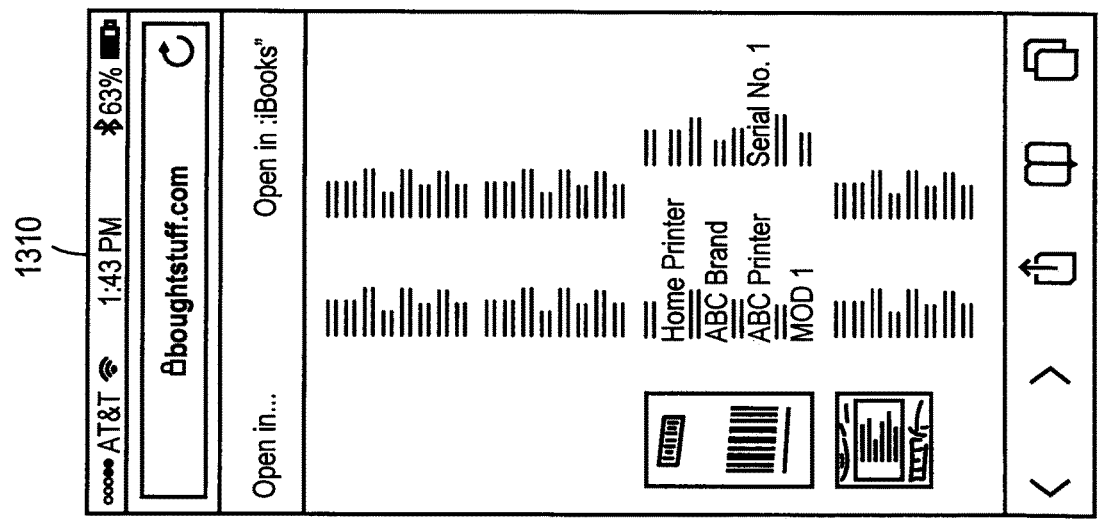
Fig. 13B.2
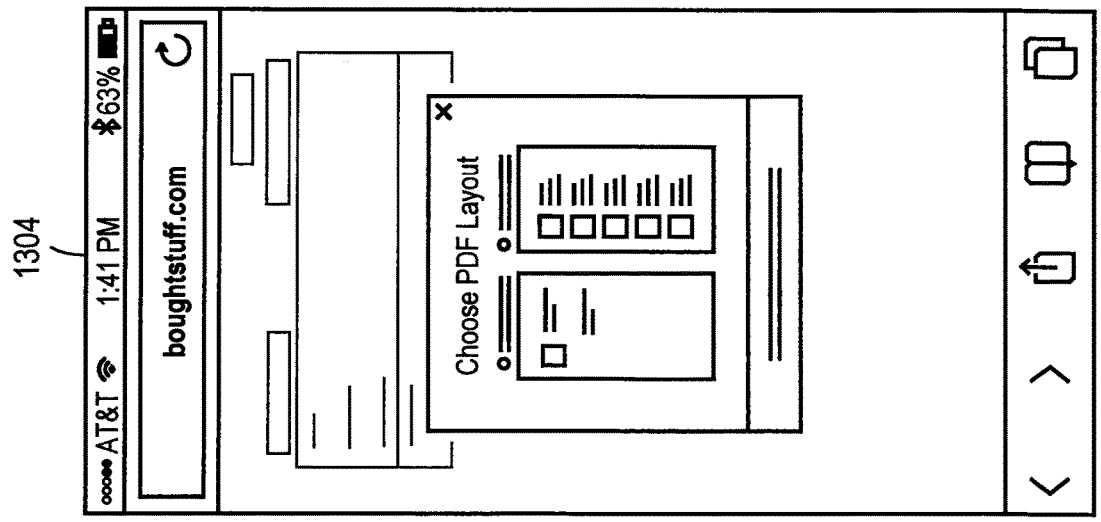
Fig. 13B.1

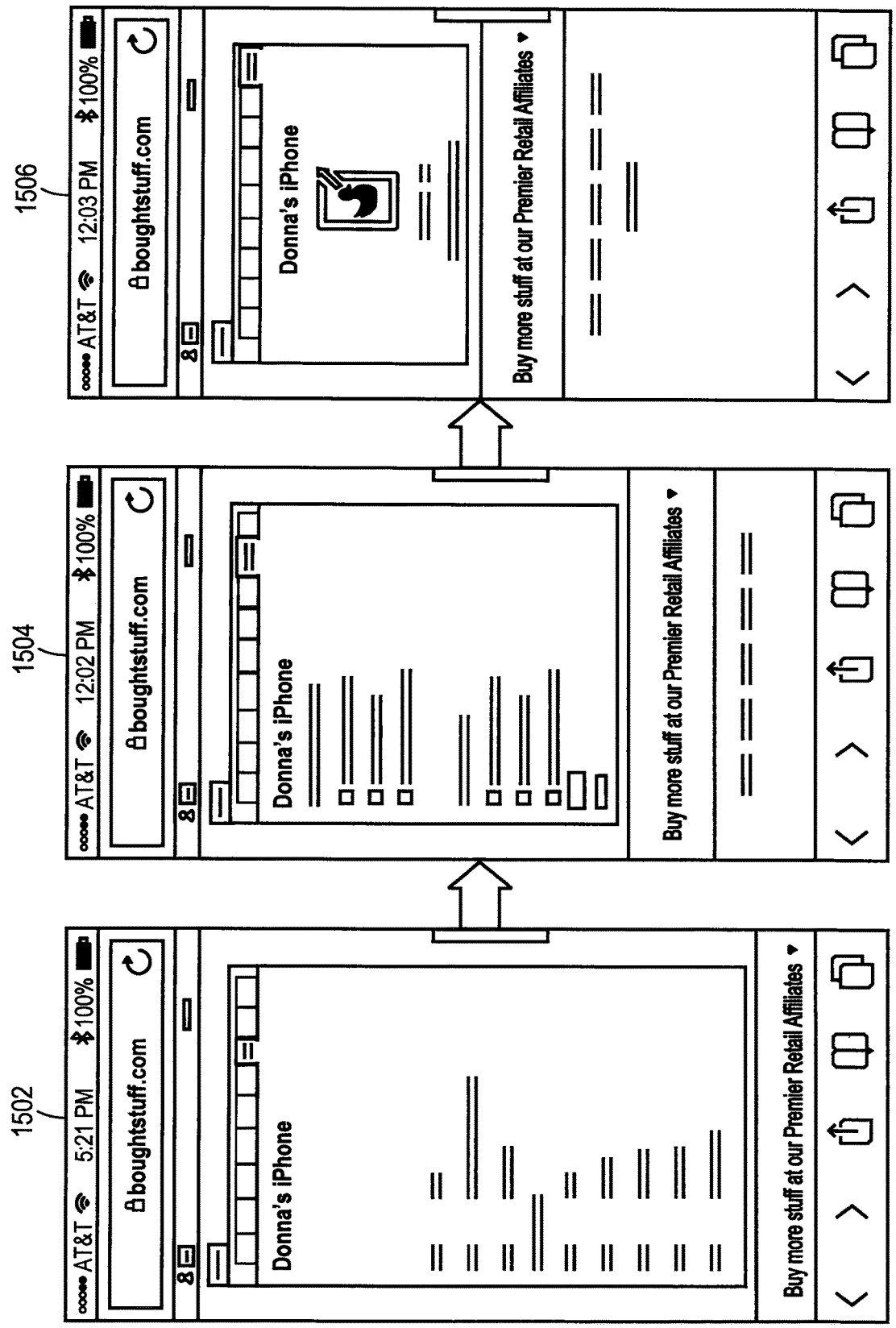

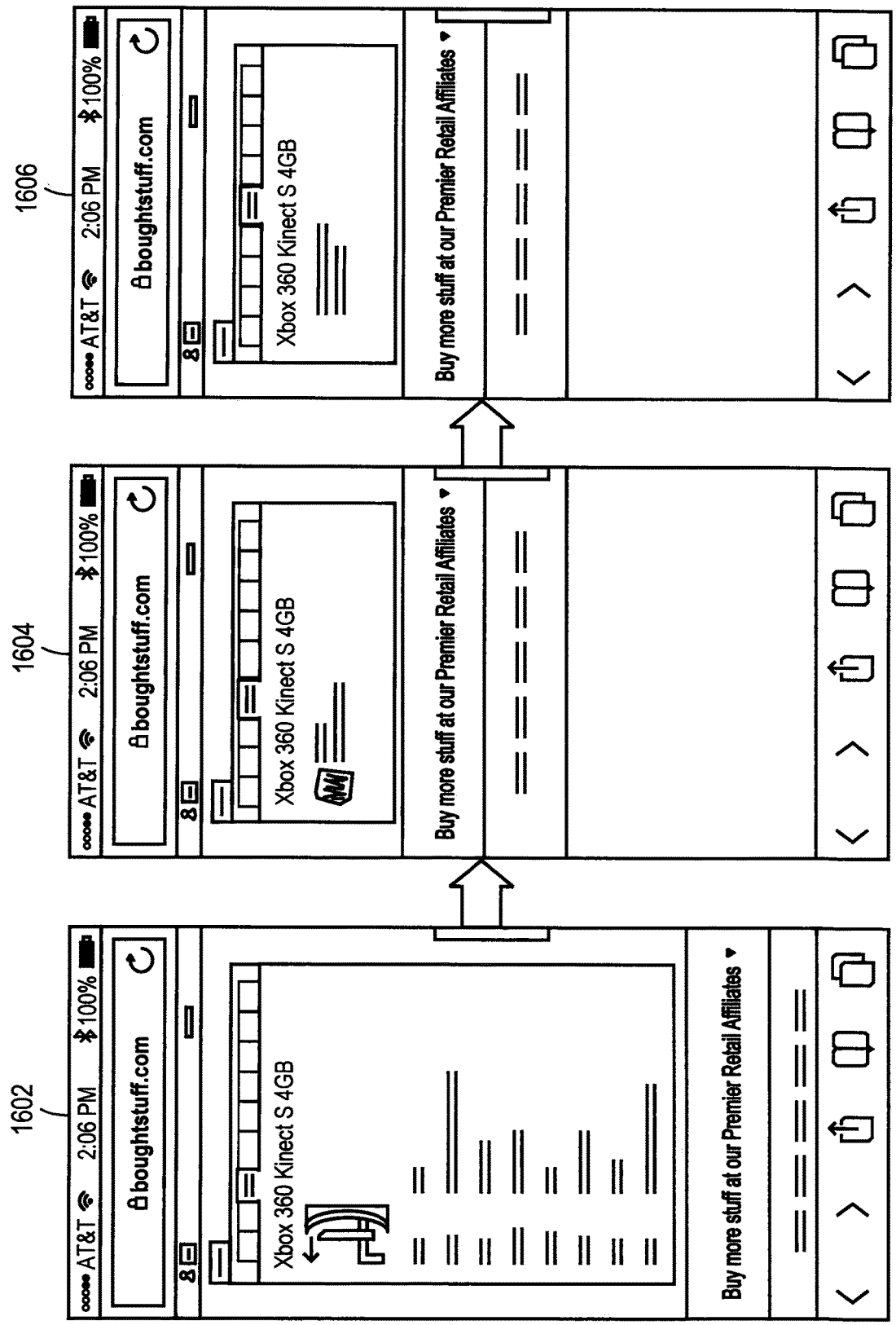
Fig. 16A.1  Fig. 16A.2  Fig. 16A.3

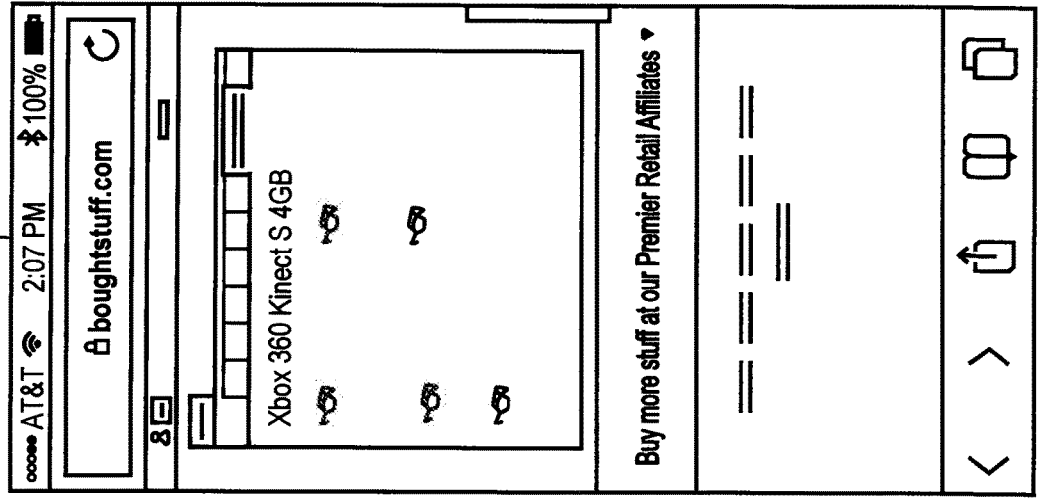
Fig. 16B.1
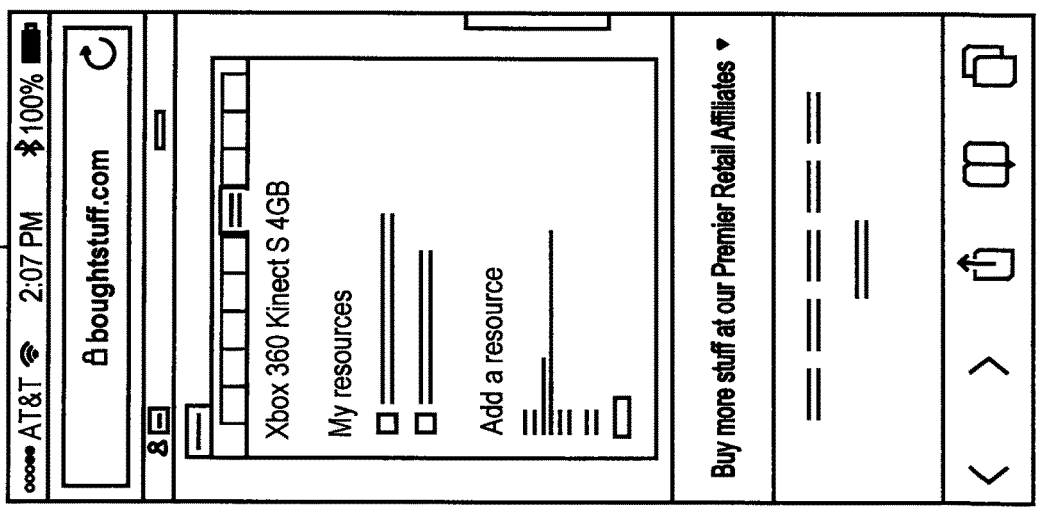
Fig. 16B.2

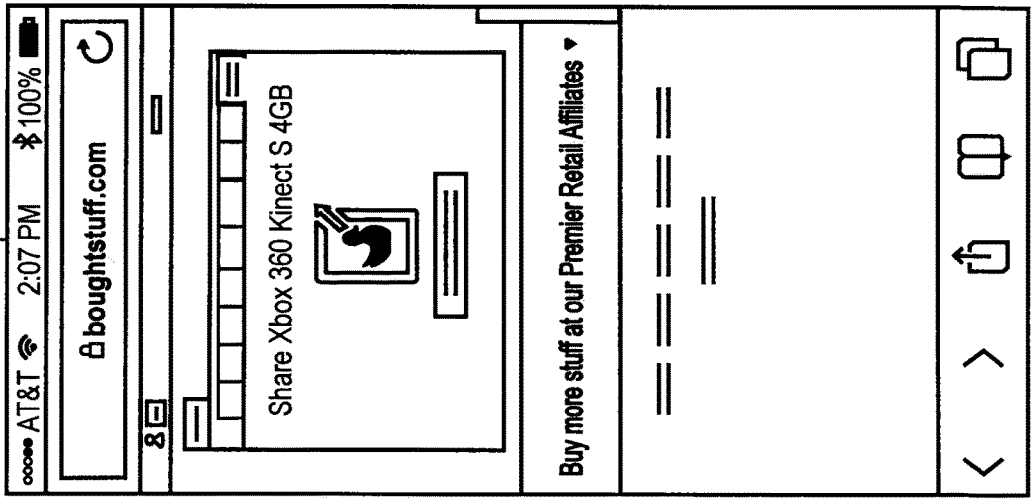
Fig. 16C.2
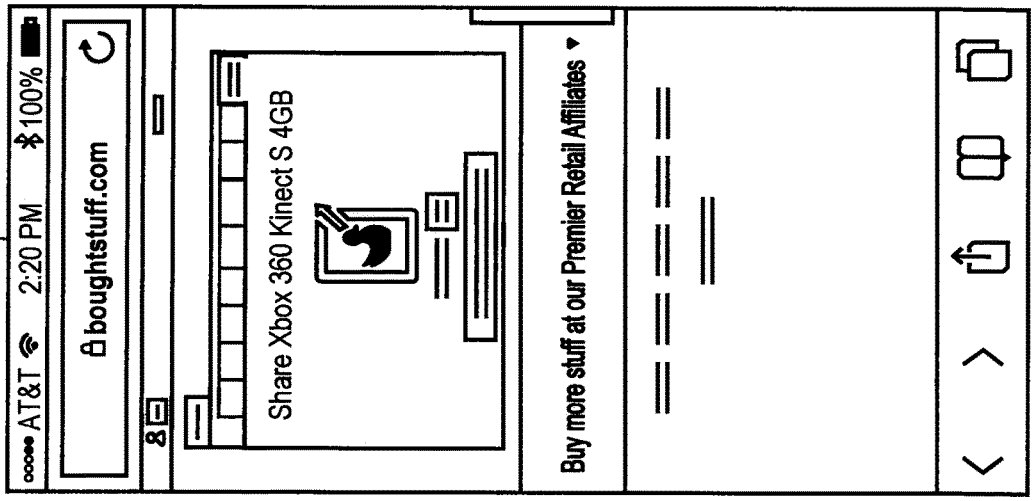
Fig. 16C.1

```
┌─────────────────────────────────────────────────────────────┐
│ USER'S PRODUCT TRANSMITS DIAGNOSTIC INFORMATION USING       │
│ LEDS (OR OTHER SHORT-RANGE WIRELESS OPTICAL                 │
│ COMMUNICATION) THAT PRODUCE VISIBLE LIGHT                   │
│ 1901                                                        │
└─────────────────────────────────────────────────────────────┘
                              │
┌─────────────────────────────────────────────────────────────┐
│ SMART PHONE DEVICE (OR OTHER MOBILE DEVICE) RECEIVES THE    │
│ DIAGNOSTIC INFORMATION BY CAPTURING THE VISIBLE LIGHT       │
│ 1902                                                        │
└─────────────────────────────────────────────────────────────┘
                              │
┌─────────────────────────────────────────────────────────────┐
│ DEVICE SENDS DIAGNOSTIC INFORMATION                         │
│ TO A REMOTE LOCATION                                        │
│ 1903                                                        │
└─────────────────────────────────────────────────────────────┘
                              │
┌─────────────────────────────────────────────────────────────┐
│ TECHNICAL SUPPORT (MANUAL OR AUTOMATIC) REVIEWS             │
│ DIAGNOSTIC INFORMATION RECEIVED AND                         │
│ SENDS COMMANDS FOR THE USER'S PRODUCT TO THE DEVICE         │
│ 1904                                                        │
└─────────────────────────────────────────────────────────────┘
                              │
┌─────────────────────────────────────────────────────────────┐
│ DEVICE SENDS COMMANDS THROUGH ITS                           │
│ CAMERA TO USER'S PRODUCT                                    │
│ (e.g., BY STROBING/PULSING THE FLASH OF THE CAMERA)         │
│ 1905                                                        │
└─────────────────────────────────────────────────────────────┘
                              │
┌─────────────────────────────────────────────────────────────┐
│ USER'S PRODUCT RECEIVES COMMANDS AND FIXES ITSELF           │
│ 1906                                                        │
└─────────────────────────────────────────────────────────────┘
```

Fig. 19

LIGHT-BASED DATA ENTRY FOR PERSONAL INVENTORY AND PRODUCT SUPPORT SYSTEM

The present application is a divisional of and claims the benefit of U.S. patent application Ser. No. 16/450,806, filed on Jun. 24, 2019, which is a continuation of U.S. patent application Ser. No. 14/754,314, filed on Jun. 29, 2015, issued as U.S. Pat. No. 10,332,121, which is a continuation-in-part application of U.S. patent application Ser. No. 14/322,857, filed on Jul. 2, 2014, issued as U.S. Pat. No. 9,978,037, which is assigned to the corporate assignee of the present invention, and incorporated herein by reference.

TECHNICAL FIELD

The technical field is generally related to cloud services and storage interfacing to computer software applications, and in particular mobile applications, that enable personal inventory management and product support.

BACKGROUND

Retail sales of consumer products have increased dramatically over the last few decades, with only temporary declines during periods of recession. At the same time the life cycle of some products is expanding. In addition, many products incorporate more complex technology than ever before. From TV remotes and alarm clocks, to the most sophisticated washing machines and microwave ovens, user manuals are often inadequate and/or difficult to use; and for many products, a user manual is no longer even provided.

As a result, the product support needs of consumers have expanded along with the growth in retail sales. Needs range from maintenance and repair to education on how to use the product, to the need to be informed in real-time when there is a product recall, even if the product was purchased as a used item. When product support needs are not met, consumers may return a product unnecessarily. This results in not only lost sales for the product manufacturer and retailer, but many returned products cannot be resold, and the cost of recycling their parts is prohibitive. As a result, these products are dumped into a landfill, which hurts the environment.

A number of different types of consumer product support services have proliferated to meet the ever-growing needs of consumers, especially with the ubiquitous availability of web-based services and social media. These range from conventional customer support provided by the product manufacturer and/or retailer via telephone, interactive websites and chat sessions, to an assortment of self-help styled online forums that provide less formal support based on collective and/or expert user experience with products. In each of these cases, the consumer must access a keyboard to enter search criteria such as the product name, serial number, or model number for a particular product. This can be burdensome to the user, particularly when using a mobile device client.

Because a typical consumer is likely to acquire products from several different manufacturers or retailers, locating and using consumer product support services offered in so many different ways from so many different sources can be daunting. Relying on web searches to find information or interacting with customer support representatives can be time-consuming and frustrating, especially when using mobile devices.

In addition, a typical consumer owns an increasingly large number of items over the course of their lifetime. Some items have a warranty period, and some items are covered by property insurance. Other items are part of a growing collection, such as a wine collection, or an art collection, or a clothing collection. As the number of such items grows, the consumer is burdened with an increased responsibility to keep track of their items.

When items need to be maintained or repaired, consumers must either find or purchase the correct parts and tools, and perform the necessary maintenance or repair, or find and retain the appropriate servicer to perform the needed work.

SUMMARY

A method and apparatus for light-based data communication for a personal inventory and product support system are described. In one embodiment, the method comprises using a device associated with a user, including capturing visible light carrying data identifying a product, obtaining the data identifying the product from the captured visible light, configuring the device to receive product support content for the product based on the identifying data, the product support content having been curated from a plurality of content servers on behalf of the user, receiving a notification that curated product support content for the product is available, and presenting the curated product support content to the user.

BRIEF DESCRIPTION OF THE DRAWINGS

The present invention is illustrated by way of example and not limitation in the figures of the accompanying drawings, in which like references indicate similar elements and in which:

FIG. 6B is a flow diagram of a process that may be utilized by a client (e.g., client 603) to cause a server to autopopulate a user's inventory database with product information (e.g., curated product support content).

FIG. 6C is a flow diagram illustrating a process that may be utilized in a server device to operate a server in conjunction with a client in accordance with embodiments of the invention;

Figures 12A, 12B:
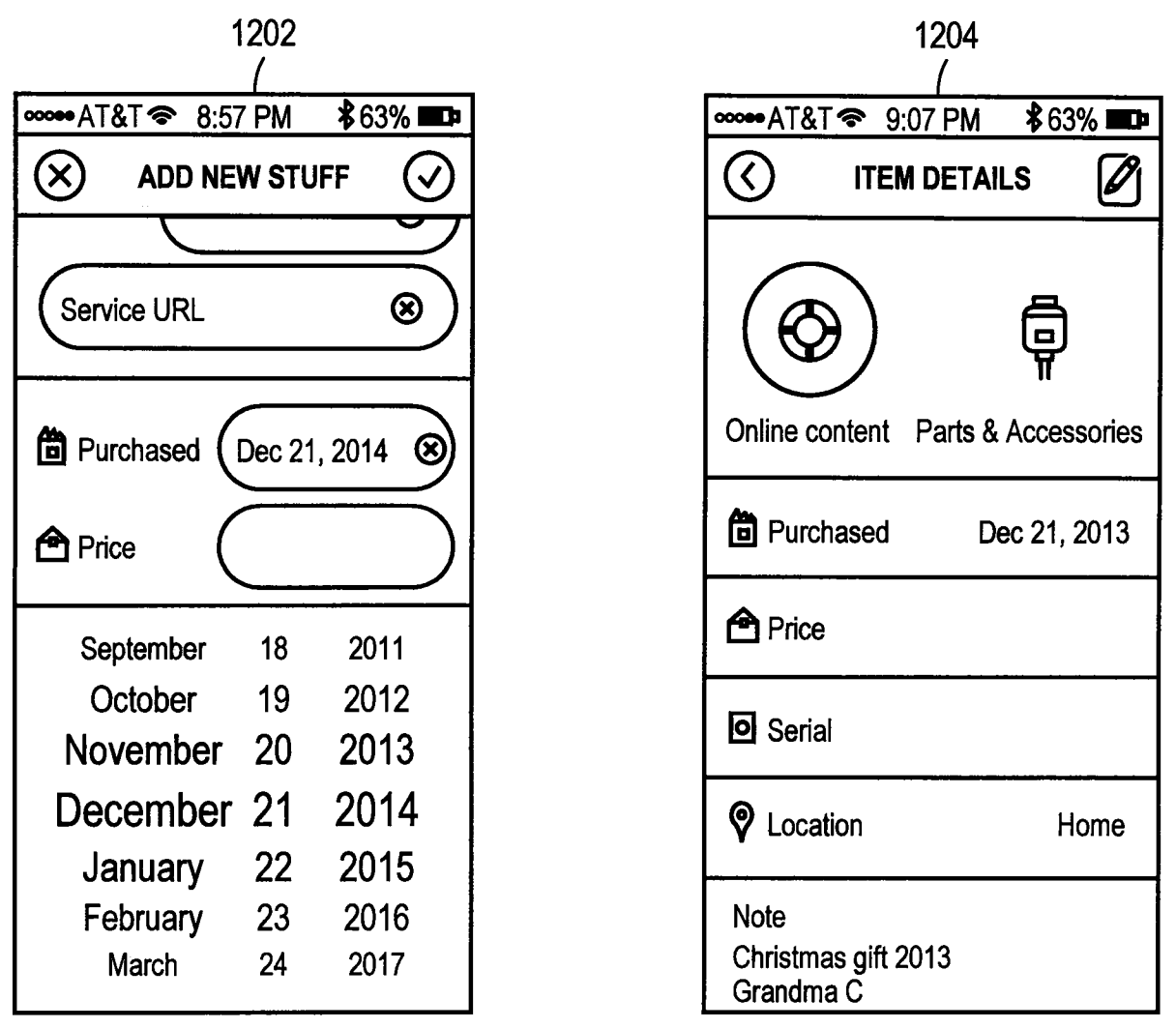

FIGS. 7A-12B illustrate examples of the mobile device client graphical user interface (GUI) implemented on a touch display device as described in accordance with embodiments of the invention;

FIGS. 13A-13B.3 illustrate examples of a personal inventory report generated in the personal inventory and product support system as described in accordance with embodiments of the invention;

FIGS. 14A-16C.2 illustrate examples of a client graphical user interface (GUI) implemented in a browser-based platform operating on a user device as described in accordance with embodiments of the invention.

FIG. 19 illustrates one embodiment of a process for updating or otherwise fixing a product.

DETAILED DESCRIPTION

Figure 1:
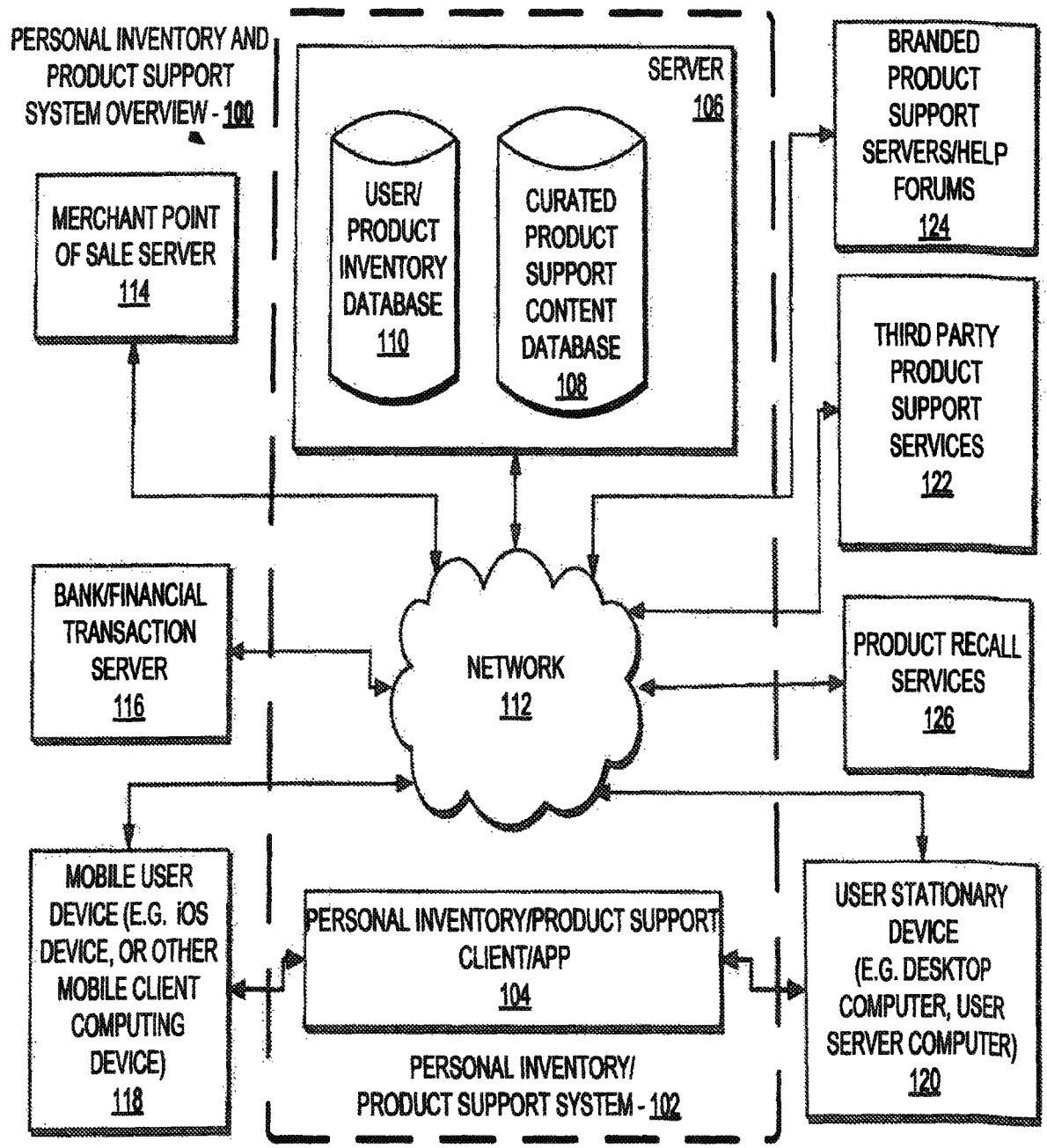
FIG. 1 illustrates of an overview of an embodiment of a personal inventory and product support system in an operating environment.

In keeping with the foregoing observations, a novel personal inventory and product support system is described in which a client operates in conjunction with a server or servers supporting one or more personal inventory and product support databases to help a user organize information about their products, and to easily access that information with a user device. In one embodiment, the novel personal inventory and product support system helps the user to access curated product support content for their products without requiring the user to search for or locate the content using a keyboard.

In one embodiment, the information about the user's products is automatically obtained and organized on the client without the need for the user to enter the information manually, through the use of LED lighting or other short range optical wireless communication on the user's products. This LED lighting communication provides product information regarding the user's product directly to the client. In one embodiment, the product information includes the make and model number of the product. In another embodiment, the product information includes a unique identifier associated with the product, such as, for example, a Universal Product Code (UPC) or a product serial number assigned by the product manufacturer. For example, the product information can be captured at the point of sale for automatic entry into the client, or as a result of a financial transaction related to the acquisition of the product, such as, for example, a credit card payment transaction between the user and a retailer.

The client may be implemented on a variety of platforms for user devices, such as a mobile application on a mobile device using a mobile operating system such as the iOS or Android operating systems, or on a browser-based application on a stationary or mobile device using a Microsoft Windows or MAC OS/X operating system. The one or more personal inventory and product support servers and databases may be implemented on a variety of server platforms, and in particular in a cloud-based storage platform to facilitate access by the client.

In one embodiment, the LED lighting communication between the user's product and client device is two-way communication. In one embodiment the two-way communication is used for programming, configuring, and/or repairing the user's product, including sending programming information to fix or update a user's product in response to diagnostic information communicated using the LED lighting on the user's product.

In one embodiment, the information about the user's products is automatically obtained and organized on the client (at the time of product acquisition) without the need for the user to enter the information manually through the use of LED lighting or other short range optical wireless communication on the user's products. This LED lighting communication provides information regarding the user's product directly to the client. In one embodiment, the information includes a unique identifier associated with the product, such as, for example, a Universal Product Code (UPC) or a product serial number assigned by the product manufacturer. For example, the product information can be captured at the point of sale for automatic entry into the client, or as a result of a financial transaction related to the acquisition of the product, such as, for example, a credit card payment transaction between the user and a retailer.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below.

The processes or methods depicted in the figures described herein may be performed by processing logic that comprises hardware (e.g. circuitry, dedicated logic, etc.), software (e.g., embodied on a non-transitory computer readable medium), or a combination of both. Although the processes or methods are described in terms of some sequential operations, it should be appreciated that some of the operations described may be performed in a different order. Moreover, some operations may be performed in parallel rather than sequentially.

In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; non-transitory media, etc.

An Example of a Personal Inventory and Product Support System

FIG. 1 illustrates an overview 100 of an exemplary personal inventory and product support system 102 in an operating environment in accordance with embodiments of the invention. The system 102 includes, among others, components to support the establishment of a curated product support content database 108 and a user product inventory database 110, functioning as cloud databases managed by a server 106. The server 106 communicates with the client 104 over a network 112. The content of the server 106 and client 104 cloud databases is accessible remotely over the network 112 by authorized users.

In a typical environment, the client 104 is implemented as an application running on a mobile user device 118 having an interactive touch screen display and a mobile operating system, such as an iOS or Android operating system. The client application 104 running on the mobile user device 118 provides the user with an easy-to-use touch interactive GUI to securely access and interact with information about their products as managed by the server 106.

In some embodiments, the client 104 can also be implemented on either a mobile or stationary user device 120 having a web-browser platform to enable the client 104 to interact with the server 106 for secure online access to product support data stored in either or both of the user product inventory database and the curated product support content database 108 in a manner similar to the application running on the mobile user device 118. As discussed in further detail below, during operation, client 104 interacts with the server 106 to access the content database 108 in response to data received via LED lighting or other short range wireless optical communication from products, acquired or owned by the user or for which the user would like to obtain product support.

Alternatively, during operation, the personal inventory and product support system 102 can also interface directly with merchant point of sale servers 114 and bank/financial transaction servers 116, as well as directly with the user to obtain identifying information about the products acquired or owned by the user and for which the user would like to obtain product support. For example, the merchant's point of sale system or the credit card issuer's transactions system could, for eligible users, transfer the product information to the personal inventory and product support system 102 at the conclusion of the product purchase. As a further alternative, a user can receive an electronic receipt from a merchant and/or credit card issuer that provides the user with a link to optionally activate the personal inventory and product support system 102 and/or transfer of the product information to the personal inventory and product support system 102 upon activation.

During operation, the personal inventory and product support system 102 further interfaces with a variety of proprietary or non-proprietary product servers from which product support information may be obtained, such as branded product support servers and guided or self-help forums 124, or third-party product support services, such as advertising services, parts and supplier services and self-help forums 122. In one embodiment, the personal inventory and product support system 102 further interfaces with proprietary or non-proprietary servers for product recall services 126, in which product recall information is received on behalf of users for products in their personal inventory, and distributed to them along with notifications to their respective client devices as needed. The product recall services 126 can include any one or more of product manufacturing and public safety agencies overseeing recalls of consumer products. In addition, the personal inventory and product support system 102 interfaces directly with authorized users via the personal inventory and product support client(s) 104 to obtain user-curated content, such as original content created by users or helpful information located and selected by users.

Figure 2:
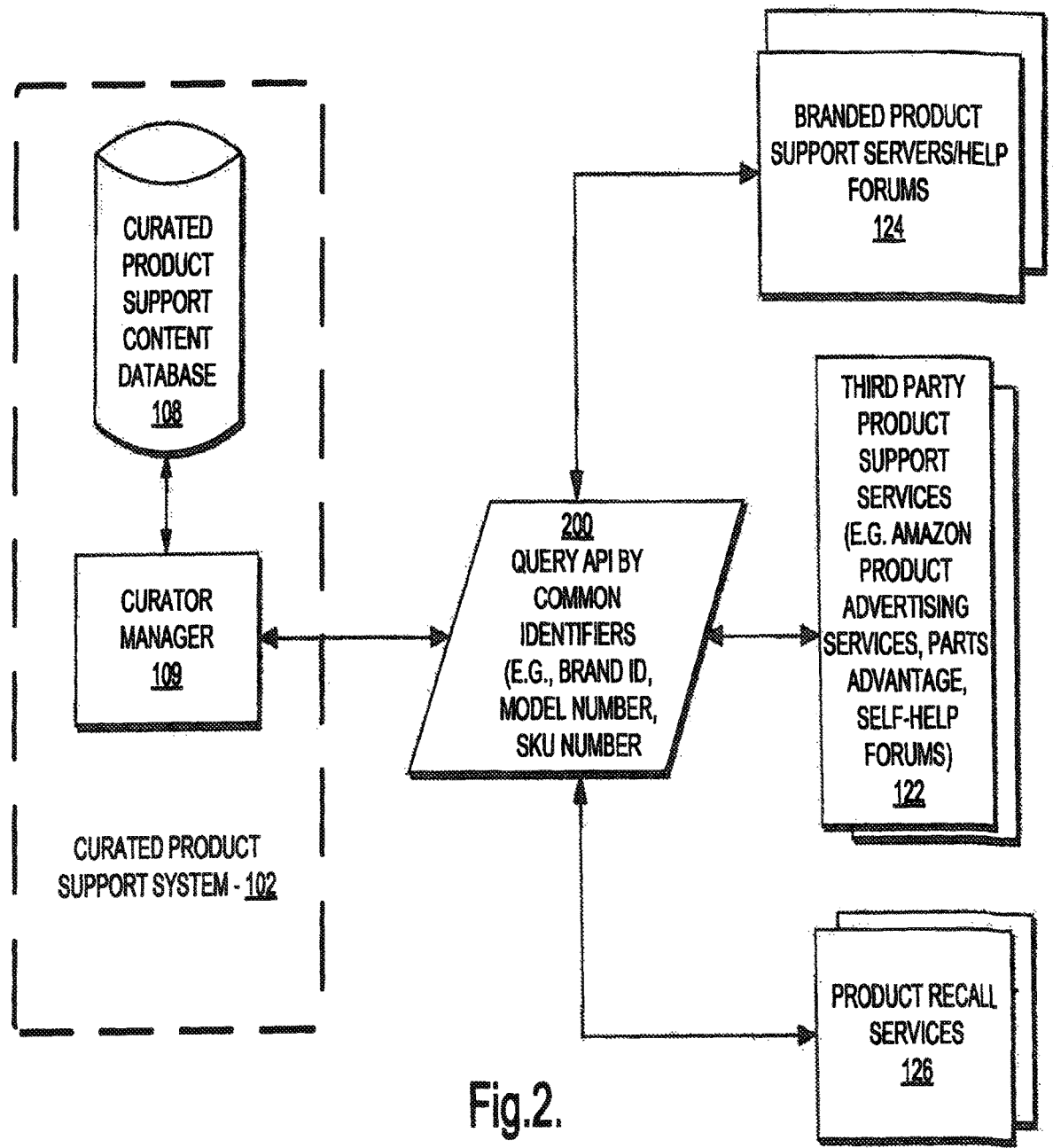
FIG. 2 illustrates the personal inventory and product support system of FIG. 1 in further detail in which the system interfaces with external product support servers to supplement the system's own curated product support database in accordance with embodiments of the invention.

FIG. 2 illustrates the exemplary personal inventory and product support system of FIG. 1 in further detail in which the system 102 interfaces with external product support servers 124/122 to manage the system's own curated product support database 108 in accordance with embodiments of the invention. As shown, the personal inventory and product support system 102 includes a curator manager 109 component that interfaces with various proprietary and non-proprietary servers 124/122 to obtain product support content that is determined to be relevant for authorized users of the system 102. The personal inventory and product support system 102 further includes a product recall manager 111 component that interfaces with the various proprietary and non-proprietary servers 126 to obtain and/or receive product recall information that is determined to be relevant for authorized users of the system 102, such as users having products in their personal inventory that are affected by the recall based on the common product identifiers associated with the products as explained further below.

In a typical embodiment, the curator manager 109 and product recall manager 111 interface with the servers 122/124/126 by way of a query application programming interface (API) 200 that is published by the servers 122/124/126 and employs common identifiers for products, such as a brand identification number, a model number, Universal Product Code (UPC), SKU number, etc. In some embodiments, a published API may be unavailable, in which case the product support content on at least the non-proprietary servers may still be curated using other search techniques, such as full-text searching, and the like.

Figure 3:
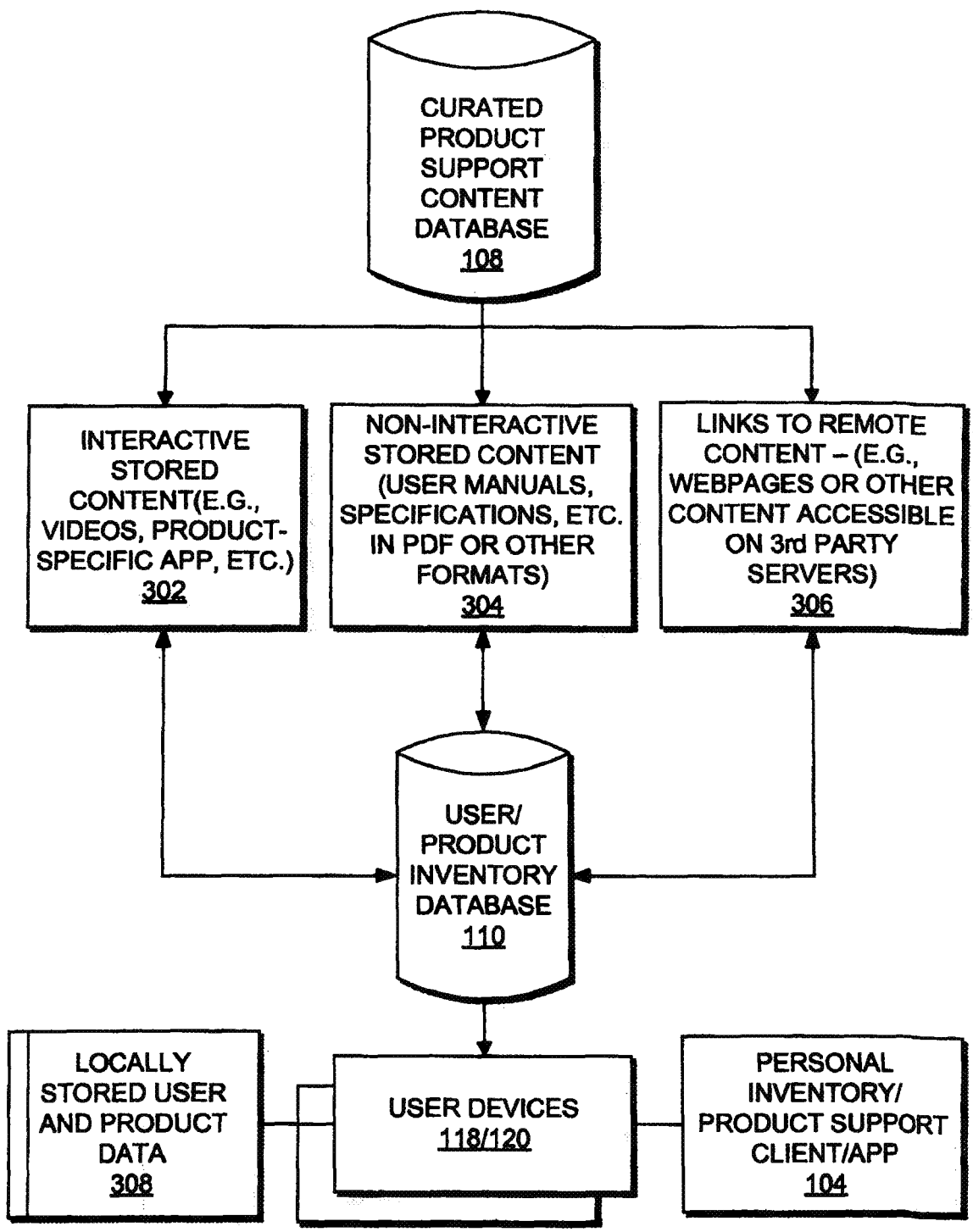
FIG. 3 illustrates the exemplary personal inventory and product support system of FIG. 1 in further detail in which selected components of the system, including the curated product support database, the user/product inventory database, and personal inventory and product support client interoperate in accordance with embodiments of the invention.

FIG. 3 illustrates the exemplary personal inventory and product support system of FIG. 1 in further detail in which selected components of the system 102, including the curated product support database 108, the user/product inventory database 110, and client 104/118/120 interoperate in accordance with embodiments of the invention.

In a typical embodiment, the types of curated product support content that are selected by the curator manager 109 for inclusion on the curated product support content database 108 include interactive stored content 302, such content as how-to-videos, links to those videos, or links to product-specific apps. Another type of curated product support content includes non-interactive stored content 304, such as user manuals in PDF formatted documents and product specification pages, and can include links to non-interactive user or product data stored locally 308 on the client device 118/120. Other types of product support content includes links to remote content, such as web pages accessible on proprietary or non-proprietary third party servers, e.g. links to relevant pages of a self-help forum, and so forth.

In one embodiment, the curated product support content of database 108 is selected or obtained by the curator manager 109 in real-time or near real-time concurrently with the acquisition of the product by a user. For example, at a merchant point-of-sale the product can be automatically added to the user's product inventory stored in the user product inventory database 110. The addition of the product to the user's product inventory in database 110 is facilitated by interfacing directly with the merchant point-of-sale or credit card issuer system used to transact the purchase of the product or, in the case of manually adding the product, is facilitated by the product support client 104 operating on client device 118/120. Once the product has been added to inventory, the curator manager 109 is triggered to obtain any available product support content.

In addition or alternatively, the curated product support content of database 108 is selected or obtained by the curator manager 109 in real-time or near real-time co-occurring with the content being made available on the proprietary or non-proprietary databases from which they originate. In other words, the curated product support manager 109 is configured to monitor the various proprietary and non-proprietary databases on behalf of authorized users for product support information relevant to the products currently stored in the users' inventory. In this manner, any new product support content is obtained by the system 102 as soon as it becomes available.

In one embodiment, the curated product support content may originate with one of the authorized users of the system 102, in which case the curated product support manager 109 will notify other authorized users that have the same product.

In one embodiment, regardless of the manner in which the curated product support content is obtained, the curator manager 109 insures that every authorized user having a product related to the curated product support content is notified about the availability of the newly obtained content.

In some embodiments, the curated product support content is not only stored on the curated product support content database 108, but is also pushed to the authorized users by automatically storing or linking the content to the relevant product stores in the pertinent entries of the user/product inventory database. When such an event occurs, each of the affected authorized users is notified by way of the personal inventory and product support client app 104/118/120. For example, in one embodiment, the system 102 sends a notification message or email to the authorized user on their user device 118/120 that can not only alert but also activate a link sending the user directly the personal inventory and product support client application 104 operating on the device 118/120. In another embodiment, the system 102 causes a notification indicator to appear on, or in association with, one or more of the personal inventory and product support application 104 interfaces displayed on the devices 118/120. In one embodiment, the notification is accompanied by an audio alert as configured on the user devices 118/120. Any number of other notification schemes may be employed by the system 102 depending on the capabilities of the devices 118/120 and the user's preferences.

In some embodiments, product recall information obtained or received from the product recall servers 126 can also be pushed by the product recall manager 111 component to the authorized users by automatically storing or linking the product recall information to the relevant product stores in the pertinent entries of the user/product inventory database. When such an event occurs, each of the affected authorized users is notified by way of the personal inventory and product support client app 104/118/120. For example, in one embodiment, the system 102 sends a notification message or email to the authorized user on their user device 118/120 that can not only alert but also activate a link sending the user directly the personal inventory and product support client application 104 operating on the device 118/120 where they can view the detailed information about the product recall, such as the nature of the recall and where to obtain assistance with the affected product. The system 102 can also cause a notification indicator to appear on, or in association with, one or more of the personal inventory and product support application 104 interfaces displayed on the devices 118/120 in association with the product recall, similar to the notification schemes described above.

Figure 4:
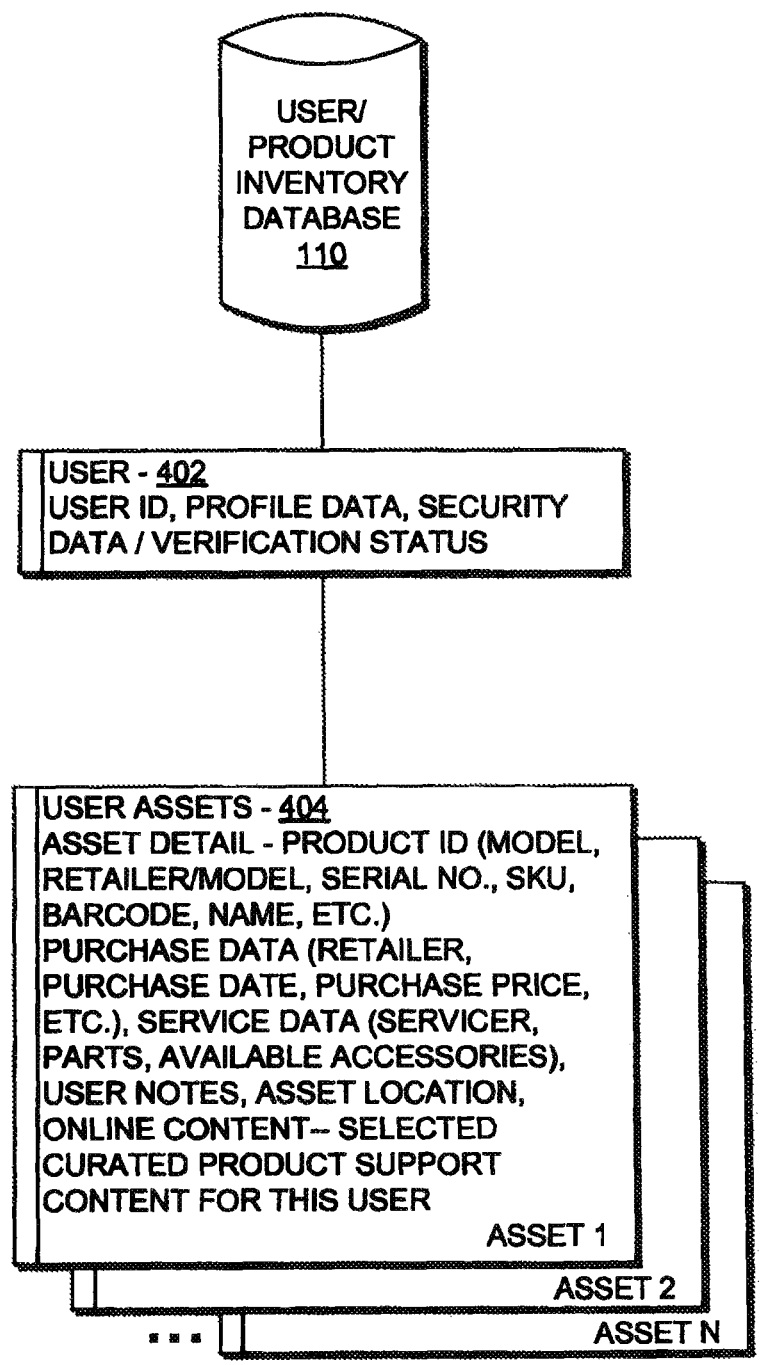
FIG. 4 illustrates the exemplary personal inventory and product support system of FIG. 1 in which the user product/inventory database component of the system is shown in further detail in accordance with embodiments of the invention.

FIG. 4 illustrates the exemplary personal inventory and product support system of FIG. 1 in which the user product/inventory database component 110 of the system 102 is shown in further detail in accordance with embodiments of the invention. As shown, the user/product inventory database 110 is used as a repository for user-specific data 402, such as, among other data, user identification, user profile, security and verification status data. Because this information is used to secure access to the system 102 and because the information is personally identifiable, it is maintained in accordance with suitable security algorithms. Some of the information, such as the verification status, may be used by the product support client app 104 to determine the navigational options and indicators displayed on the app's GUI. For example, users that have created accounts on the system 102 but have not yet completed all of the verification steps will continue to be alerted and/or prompted to complete the verification steps prior to accessing the product support information maintained in the system 102. Alternatively, for example, users that have not yet completed all verification steps will have reduced functionality on the client, such as a limited number of products in their inventory or an inability to access video content or receive product recall notices or service reminders.

In one embodiment, the bulk of the content maintained on the user/product inventory database 110 is the user assets content 404, which contains, for each product/asset acquired and inventoried by the user, the product identification information that has either been automatically populated by the system 102 at the time of product acquisition, or has been manually entered by the user using the features of the product support client app 104. Besides the product identification information, additional product related information that is specific to the user and/or specific to the product includes the purchase data, including the retailer from which the product was acquired, the purchase price, product service data, available accessories, user notes, and the product's (asset's) location.

In one embodiment, the remaining content maintained on the user/product inventory database 110 includes online content. Online content generally refers to product-specific content that can be accessed online separately or in addition to accessing the information using the consumer product support app 104. The online content typically links to content stored on the curated product support content database 108, or to content stored on an external database including, among others, proprietary and non-proprietary content stored on the branded product support servers/help forums 124 and third party product support servers 122, such as related product advertising services, parts and supplies services and self-help forums and user groups. In one embodiment, all of the content maintained on the user product inventory database 110 is securely accessible to authorized users using the personal inventory and product support client application 104.

Figure 5:
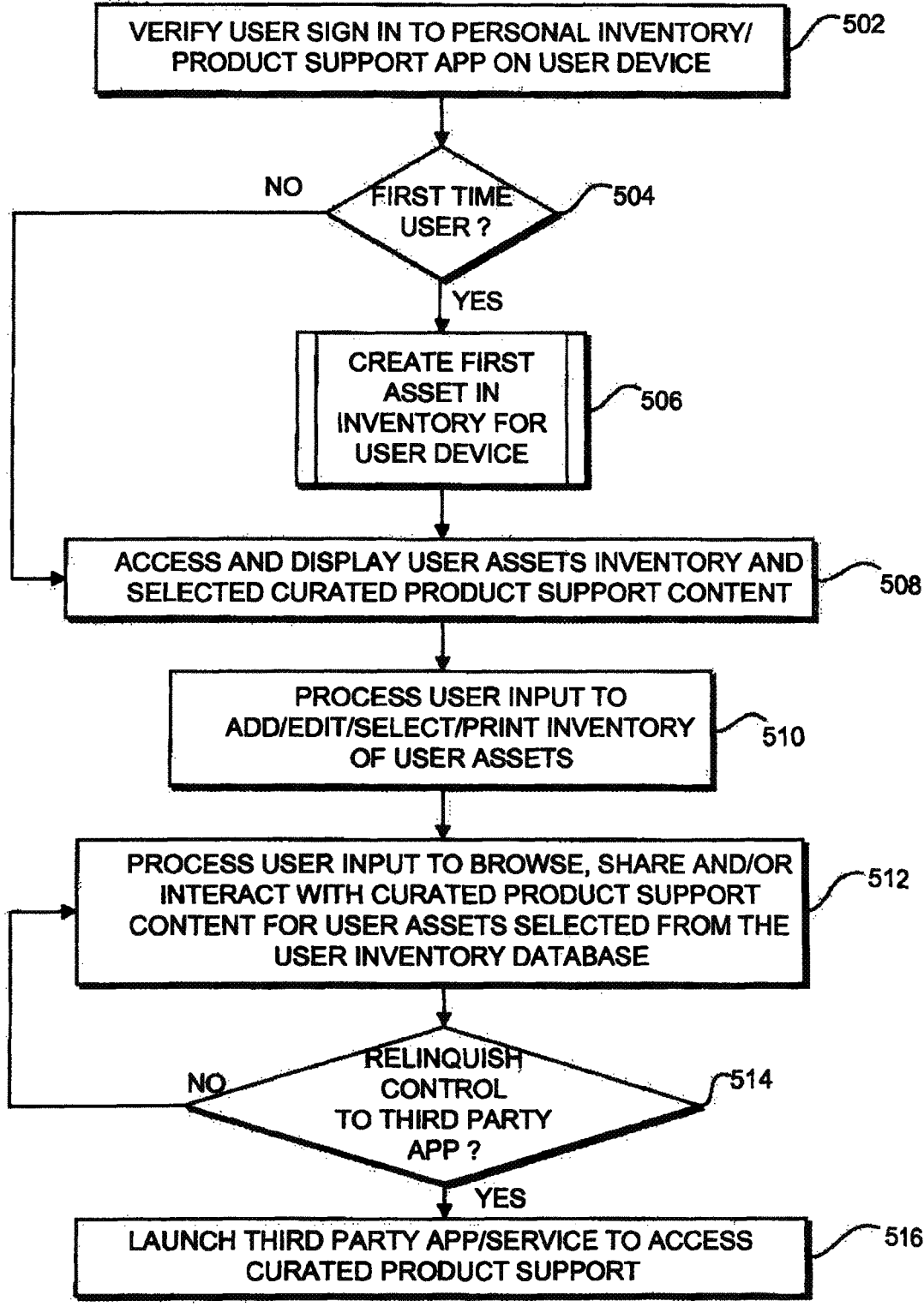
FIG. 5 is a flow diagram illustrating a process that may be utilized in a user device to operate a client in conjunction with a server in accordance with embodiments of the invention.

FIG. 5 is a high-level flow diagrams illustrating process 500 that may be utilized to operate a personal inventory and product support client in conjunction with a personal inventory and product support server in accordance with embodiments of the invention. With reference to FIG. 5, in a user device, such as devices 118/120 (FIG. 1), at block 502, a client process 500 verifies a user signing in to use a personal inventory and product support application 104. For example, as part of the security procedures for maintaining the integrity of the system 102, in one embodiment the process 500 requires a prospective user to not only create a user id, but to also confirm the existence of the contact information provided at initial signup, such as the email address or mobile phone number. In one embodiment, this includes successfully receiving and/or responding to a notification sent to the contact information.

The process 500 continues at decision block 504 to determine whether the user is a first-time user. If so, then an automated process begins at block 506 to create the user's first asset in the user/product inventory database 110. This may be accomplished, for example, by extracting information from the user device 118 upon which the personal inventory and product support app 104 is operating. In one embodiment, the extracted information includes such information as model number, serial number, operating system, etc. In this manner, the user device 118 becomes the first product added to the user's personal inventory and the first product for which curated product support is obtained using the personal inventory and product support system 102.

At process block 508, the process 500 continues with the access and display of the user's current inventory and the selected curated product support content. For example, the first product added to the inventory in process block 506 is displayed in the first default folder provided by the application 104. At process block 510, the process continues with receiving input from the user via the app's GUI to add, edit, organize and/or print the user's current inventory. The adding, editing and organization tools and navigational aids of the consumer product support application 104 are described in further detail with reference to FIGS. 7A-14C.2, and include the ability to upload one or more photographs of the product for insurance of other purposes.

In one embodiment, at block 510, the input to print the user's current inventory triggers the creation of a complete product inventory report (an example of which is described and illustrated in FIGS. 13A-13B.3) that is presented to the user for immediate download and/or transmission to an email address associated with the user, or to another email recipient as authorized by the user. In one embodiment, instead of printing the product inventory report, the user is directed to a reader application on their device and the product inventory report is automatically launched for reading on the device. The inventory report can be used, for example, to help a user to document assets for purposes of insurance or warranty recovery.

In one embodiment, the process 500 continues at block 512 to process user input to browse, share and/or interact with the curated product support content for selected assets. For example, if the user has a product that needs to be serviced, such as a printer device that is out of ink or a toaster oven that is not working properly, the user can navigate the products displayed in the application's GUI to view parts and supplies links or service and repair information that have been curated for the product.

At decision block 514, the process 500 continues by determining whether it is necessary to relinquish control to a different application on the user's device to view the information to which the user has navigated at block 512, including determining whether it is necessary to relinquish control to a third party application. For example, for some of the curated product support content, a link to an external server may be provided in order for the user to directly access the curated product content, such as a webpage on a user forum for the product, or a parts catalog website for product parts and supplies, or a reader app to view a user manual in a PDF format, such as the iBook app on the iPhone. In such cases, the process 500 continues at block 516 to automatically launch the third party app or service to access the curated product support content.

In one embodiment, products are added to the personal inventory based on data received from the product itself via visible light from a short-range optical wireless communication system on the product. In one embodiment, the short-range optical wireless communication system is an LED-based optical wireless communication system.

Figure 6A:
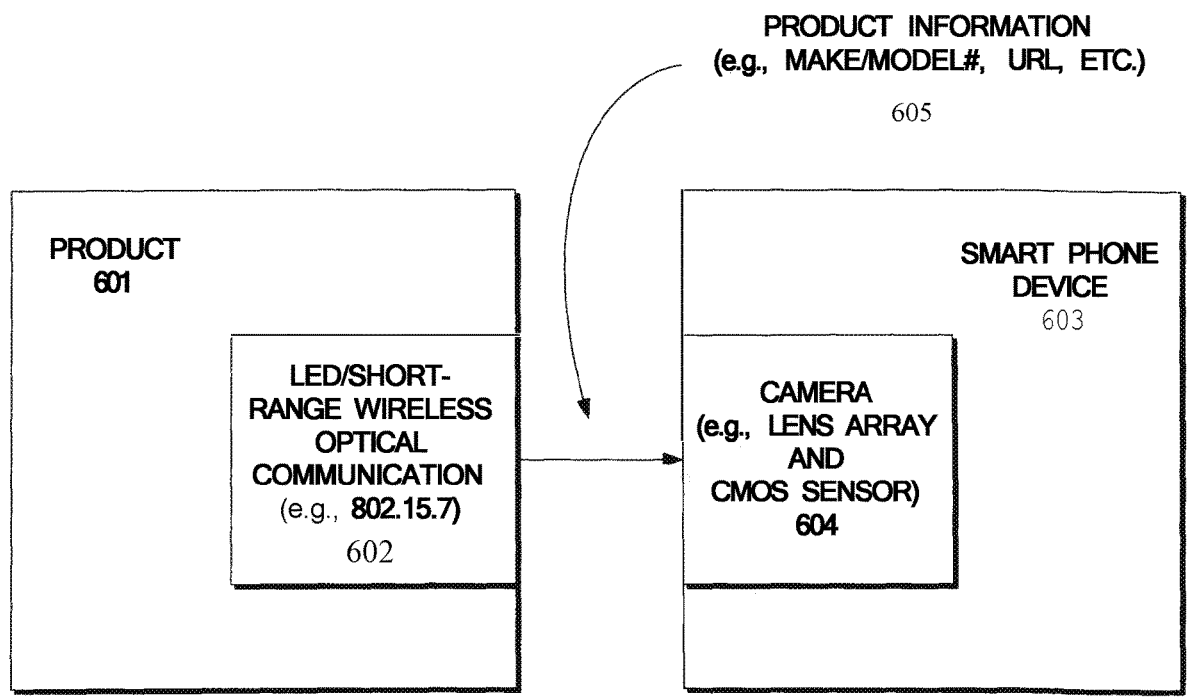
FIG. 6A illustrates the interaction between a product and a smart phone client device upon which the client application may run.

FIG. 6A illustrates the interaction between a product and a smart phone client device upon which the client application may run. Referring to FIG. 6A, product 601 includes an LED light or other short-range wireless optical transmitter 602. In one embodiment, the short-range optical wireless transmitter 602 operates according to the 802.15.7 Standard.

Transmitter 602 of the short-range wireless optical communication system sends product information 605 to device 603 using the visible light. In one embodiment, the data that is transmitted is the make and model number, or other identification information regarding the product (e.g., serial number, UPC code, RFID, QR code, etc.). In another embodiment, the information includes a universal resource location (URL) or other content identifier. Note that transmitting the make and model number instead of a URL or other content identifier may be beneficial because product information at a URL or other content identifier may have become stale by the time a user desires to obtain such content. By having the make and model number, a user may be able to obtain any content that didn't exist when the product was added to the inventory.

A device 603 (e.g., smart phone device) includes a camera 604 (e.g., lens array and a CMOS sensor) that captures the visible light from transmitter 602. In one embodiment, camera 604 captures the light from LEDs of transmitter 602, which is pulsing light.

Device 603 receives product information 605 and the client application uses that information to have the server populate the user's product inventory automatically. In one embodiment, the client application requests correlated information, based on the make and model number of the product, where the correlated information comprises URLs or other information that can be used to obtain additional products to the product as discussed herein. In one embodiment, the correlation is performed ahead of time when the URLs or other information are added to the server databases as part of the curating process. The client application requests some/all of the correlated information from the server components as needed.

FIG. 6B is a flow diagram of a process that may be utilized by a client (e.g., client 603) to cause a server to autopopulate a user's inventory database with product information (e.g., curated product support content). The process is performed by processing logic that may comprise hardware (circuitry, dedicated logic, etc.), software (such as is run on a general purpose computer system or a dedicated machine), firmware or a combination of these three.

Referring to FIG. 6B, the process begins with capturing, by the camera of the client, the visible light containing data identifying a product, transmitted by the product itself (processing block 611). In response to the captured visible light, processing logic in the client obtains the data identifying the product from the captured visible light (processing block 612). In one embodiment, obtaining the data identifying the product comprises performing image processing on captured images of visible light, performing a parallel-to-serial conversion, and optimally decoding the serial processed image data.

Once the data identifying the product has been identified, then processing logic on the server notifies the server about the new product (processing block 613). This may be performed using wireless or wired communications of the device. This may include sending information over the Internet to the server.

Processing logic also configures the device to receive product support content for the product (processing block 614). Subsequently, processing logic on the device receives a notification (either wirelessly or via wired communication) that curated product support content is available for the product (processing block 615).

Thereafter, processing logic on the device displays the curated product support information on a display screen of the device (processing block 616).

FIG. 6C is a flow diagram illustrating a process that may be utilized in a server device to operate a server 106 in conjunction with a client 104 (e.g., device 603 exacting a client application) in accordance with embodiments of the invention. With reference to FIG. 6, in a server computer, such as server 106 (FIG. 1), at block 622, a server process 600 receives notification of a user's acquisition of a product from a third party such as a merchant 114 or a financial institution 116 with which the system 102 has established a business relationship that allows detailed product information to be obtained in connection with a transaction for acquiring the product, such as, for example, a credit card transaction, or a retail point of sale cash transaction.

In one embodiment, the product detail information thus obtained is used to automatically populate the product identifying and other information, such as purchase date, amount, brand and model number, etc. on the user/product inventory database 110 eliminating the need for the user to enter the product information. In one embodiment, upon purchase, a receipt is sent (e.g., emailed) to the user while also sending the receipt to the server 106, which triggers product support contact acquisition and subsequent user notification.

At process block 624, should the information about the product not be readily available at the time of acquisition, then the user can manually add the product to her inventory using the personal inventory and product support application 104 installed on her mobile device 118. In this scenario, at block 624, the server 106 operates in conjunction with the client 104/118 to receive the product information and add it to the user/product inventory database.

Regardless of whether the product detail information is obtained automatically or through manual entry, the process 600 continues at block 628, in which the server 106 obtains available curated product support content from database 108, and makes that content accessible to the user on their devices 118/120 via the personal inventory and product support application 104. Should curated product support content not currently be available from database 108 a process, such as a curator manager 109 as described with reference to FIG. 2, is launched to search for and obtain content from external servers, including the branded and third party product support servers 124/122 described with reference to FIGS. 1 and 2.

At process block 628, the process 600 continues with serving the available curated product support content upon user demand to the user's device 118/120 in conjunction with the personal inventory and product support application 104. At decision block 630, the process 600 assists the client 104/118 in relinquishing control to view the product information that has been served including, at block 632, the automatic launch of the third party application or service to access the served content.

Figure 18:
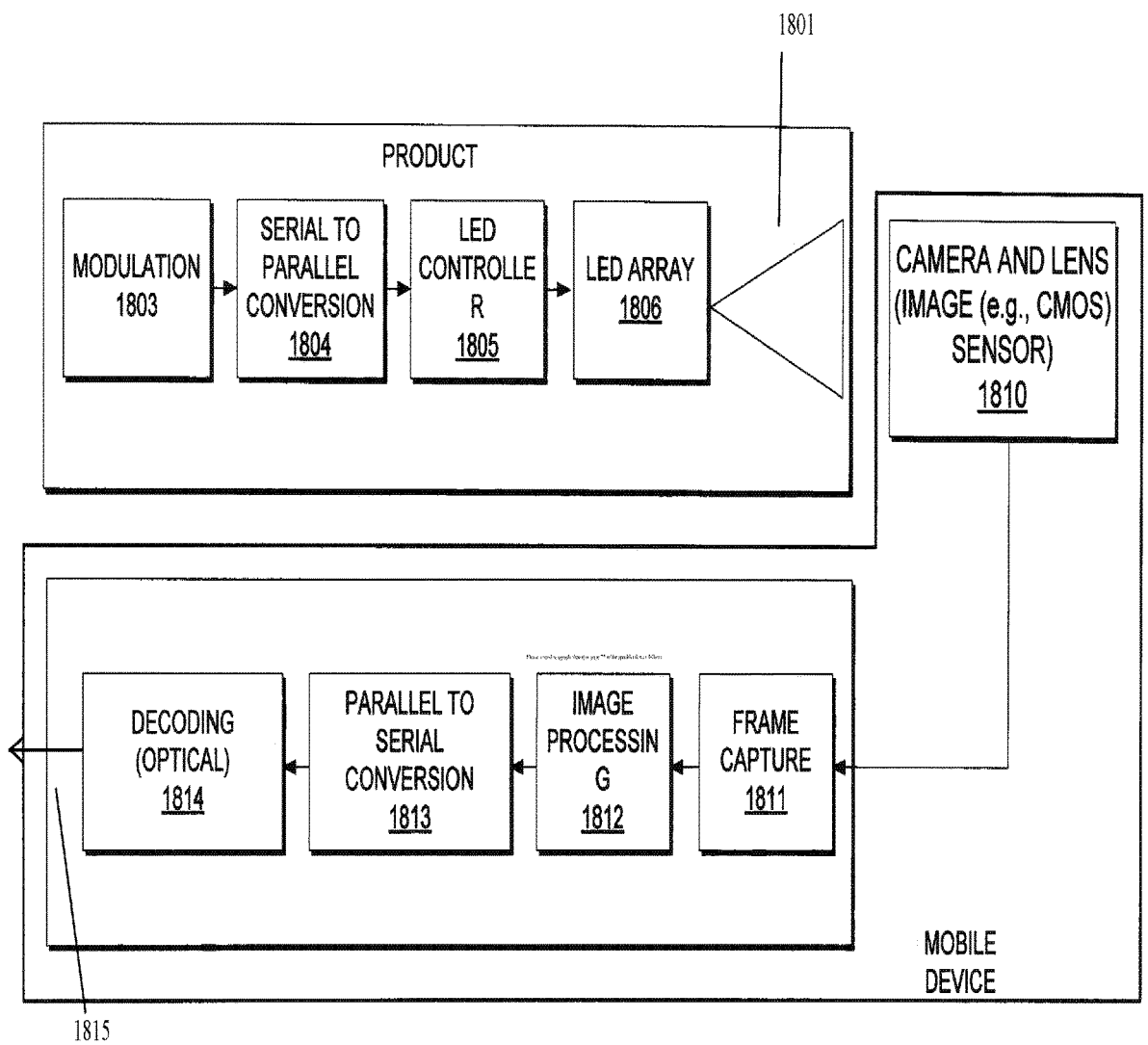
FIG. 18 illustrates the short-range wireless optical communication system in more detail.

FIG. 18 illustrates the short-range wireless optical communication system in more detail. For the transmitter, in one embodiment, multiple arrays of LEDs are included with each LED or group of LEDs used as a transmitting antenna. The camera of the end user device (e.g., mobile device) represents a receiver with an image sensor. The optical communications system modulates each LED light with data bits that can be received by a camera, which then decodes the bits and extracts the data. In one embodiment, each LED can transmit a unique data stream, and thus each LED light can broadcast product information. [Each LED illuminates a unique pixel in the image sensor of the camera. Because of the camera lens, spatial separation from the multiple LED sources is possible. Thus, in one embodiment, multiple LEDs transmit product information and multiple transmissions are received by the camera.

Note that the data rate of an individual LED is very low. Therefore, in one embodiment, a large numbers of LEDs is used to obtain a higher data rate, which shortens the amount of time the user must point the camera at the LEDs. Also, in one embodiment, the LEDs are general purpose and can send information besides make and model number. Thus, the number of LEDs is variable depending on the specific implementation. There could be thousands of LEDs, for example.

The output of the camera sensor is sent to a data recovery algorithm to obtain the data. The data recovery algorithm basically extracts and recognizes the data from the LED projections. In one embodiment, the LED candidates are extracted by thresholding the pixel intensity values and are correctly recognized by their unique IDs. In one embodiment, a multiple hypothesis tracking (MHT) based algorithm is used for data recovery. In such embodiments, each LED projection path corresponds to LED data, and the MHT based algorithm tries to evaluate the probability of each path hypothesis. In one embodiment, the product uses a frequency shift keying modulation scheme which different frequencies are used for different bit patterns. In such a case, during demodulation, FFT or autocorrelation methods are used to read the signal to determine the locations of data.

In one embodiment, the LED transmits a make and model number. In another embodiment, the LED transmitter transmits a URL. Mobile devices with unmodified cameras receive the product information from the visible light transmitted by the LED and retrieve additional information about the product using the information received.

Referring to FIG. 18, the product generates or broadcasts information through an LED array which includes a transmitter. Product information 1801 that is broadcast is optically encoded by encoder (not shown) and modulated by modulator 1803 to create a data stream. The data stream then undergoes a serial to parallel conversion 1804 and a mapping to LED array 1806 using an LED controller 1805, and thereafter broadcast. In one embodiment, where product information 1801 is static, the operations of encoding, modulation, and serial to parallel conversion could be performed prior or during manufacturing and the data stream for each LED may be stored on the product. In such a case, LED controller 1805 provides the data to LED array 1806 for transmission through the optical channel.

With respect to the mobile device, a camera 1810 that includes an image sensor and lens captures a frame 1811 of data. The captured data then undergoes image processing 1812 which in one embodiment includes frame sampling and decoding. Thereafter, the decoded data optionally undergoes demapping and then undergoes parallel to serial conversion 1813 to create a data stream. The data stream is then optionally decoded 1814 and output as output data 1815 for further use by the client application receiving on mobile device.

In one embodiment, the optical wireless communication system of the product may be used to convey diagnostic information. The user device receives the diagnostic information and transfers it to a call center for handling. In one embodiment, the product includes an optical receiver and the call center sends commands in part optically, to the product, via the end user device's camera flash. The product receives the commands and programs, configures, or otherwise fixes itself.

FIG. 19 is one embodiment of a process for updating or otherwise fixing a product. The process is performed by processing logic that may comprise hardware (circuitry, dedicated logic, etc.), software (such as is run on a general purpose computer system or a dedicated machine), or a combination of both.

Referring to FIG. 19, the process begins by the user's product transmitting diagnostic information using an LED or other short-range wireless optical communication system communication using visible light (processing block 1901). In one embodiment, the diagnostic information is information that specifies what is currently occurring with the product. This may include a video or other information collected by the product that indicates how the product is operating and/or a problem or problems that are occurring with respect to the product. The smart phone device (or other mobile device) receives the diagnostic information (processing block 1902). In one embodiment, such a device may be used by a technician that is in the field to fix the product.

After receiving the diagnostic information, the device sends the diagnostic information to a remote location (processing block 1903). In one embodiment, this information is sent wirelessly from the device. Alternatively, the information may be sent via a wired connection to the remote location. The remote location may be over the internet. In one embodiment, the device is sending the diagnostic information to a call center that is able to handle the information.

After receiving the diagnostic information, technical support (manual or automatic) reviews the diagnostic information and sends commands to the device for use with the user's product (processing block 1904). In response to receiving these commands, the device sends the commands through its camera to the user's product (processing block 1905). In one embodiment, this is performed by strobing or pulsing the flash of the camera.

The user's product receives the commands by receiving flashes from the camera of the device and uses the commands or other information to fix itself (processing block 1906).

There is spatial separation of multiple LEDs at the receiver side. With respect to the spatial separation, the objective is to distinguish the multi-channels by successful pixel separation. Thus, in an algorithm, it is necessary to distinguish the pixel.

Figure 20:
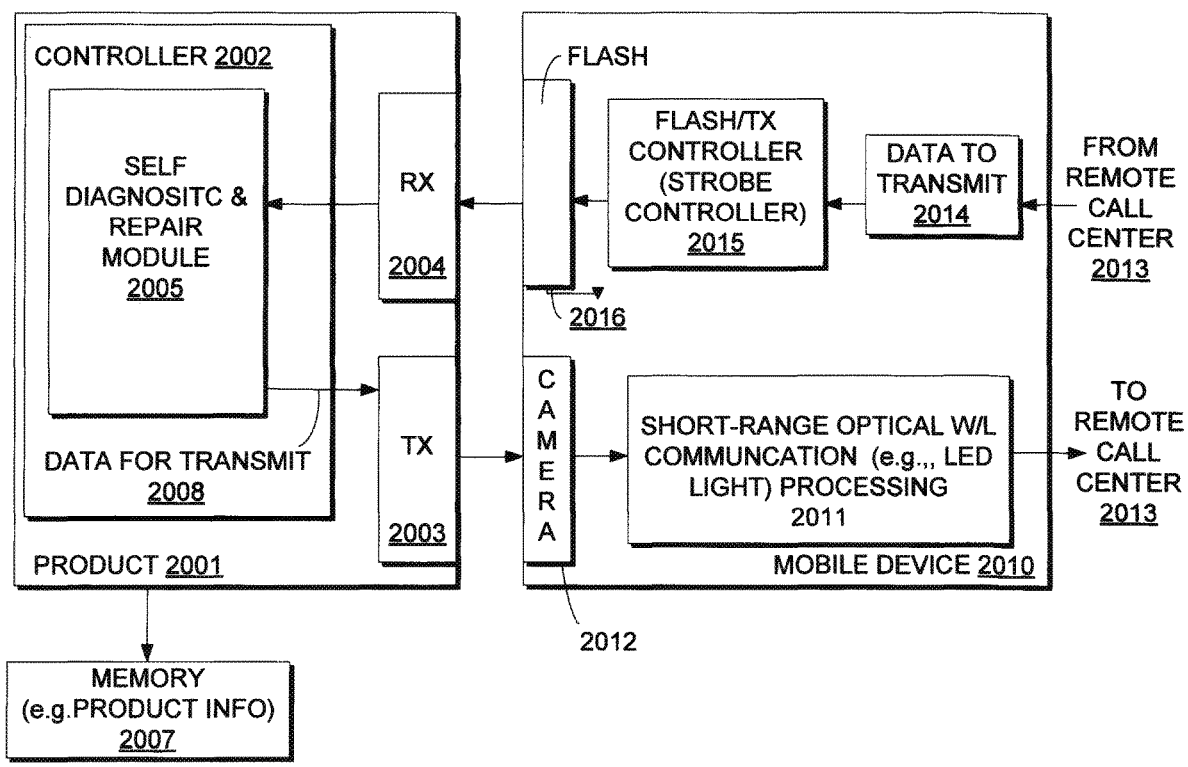
FIG. 20 illustrates one embodiment of a product and mobile device (e.g., a smart phone client device) that communicate with each other.

FIG. 20 illustrates one embodiment of a product and mobile (client) device (e.g., a smart phone client device) that communicate with each other. Referring to FIG. 20, product 2001 includes a controller 2002 with a self diagnostic and repair module 2005. Module 2005 obtains diagnostic information about the operation of product 2001 and sends the information as data 2008 via transmitter 2003 to mobile device 2010. In one embodiment, the diagnostic information may include, for example, information that a water filter needs replacement in a refrigerator, information indicating a compressor failure in the refrigerator, information indicating the top element in the oven is burned out, or information indicating there is an imbalanced load in a washing machine. This information may be stored in memory 2007. Other product information, such as, for example, but not limited to, product make and model number, URL or other resource locator information may also be stored in memory 2007.

Transmitter 2003 transmits data 2008 containing the diagnostic information to mobile device 2010 using visible light from LED lighting or another short-range wireless optical communication technique described above.

Mobile device 2010 includes a camera 2012 that captures the visible light transmitted by transmitter 2003 and short-range wireless optical communication processing 2011 processes the captured light data to obtain the diagnostic information contained therein. Mobile device 2010 sends the diagnostic information, using wireless or wired communication, via communication hardware and software, to a remotely located call center 2013, where the information is processed. Such call center processing may include determining a diagnosis of a problem with product 2001 as well as the generation of commands to fix product 2001. The commands are given by the call center person to the user of the client device over the phone and/or through the client application to the product using the two-way LED communication. An engine light on a car could transmit diagnostic information that can be viewed by a mechanic at a call center for remote diagnosis and repair suggestions. In one embodiment, commands configure the automobile to perform tests on the car remotely from the call center through the client. Other commands could be to configure an espresso maker to change the hot water temperature, or other settings.

The commands from call center 2013 are sent to mobile device 2013, which creates data 2014 for transmit to product 2001. Data 2014 is sent to a flash/transmitter (strobe) controller 2015, which controls the camera flash 2016 of mobile device 2010 to perform optical communication of data 2014 to product 2001 by strobing the flash (e.g., IEEE 802.15 WPAN Task Group 7 camera flash presentation entitled, "Task Group IEEE802.15.7r1 Short-Range Optical Wireless Communications Kickoff Tutorial", dated March 2015, https://mentor.ieee.org/802.15/dcn/15/15-15-0112-02-007a-short-range-optical-wireless-communications-tutorial.pdf.).

Product 2001 includes an optical receiver 2004 that records the strobed flashing from mobile device 2010 and sends the obtained data to self diagnostic and repair mobile 2005. In one embodiment, the LED receiver is not on all the time, and is only turned on when the user selects it through the client application. Self diagnostic and repair mobile 2005 uses the commands in data 2008 that were received by optical receiver 2004 to correct one or more problems being experienced by product 2001. In one embodiment, to correct the problems, these changes are configuration changes to the product and the product simply updates its configuration file with the new settings. Note that the power source for the product's transmitter and receiver is from the product itself or battery power.

Example Graphical User Interface and Reports for the Personal Inventory and Product Support Application In one embodiment, the client is configured to help the user organize information about their products manually using an interactive graphical user interface (GUI) displayed on the user device. In one embodiment, whether automatically or manually, once organized, the information configures the client operating on the user device to automatically receive the latest product support content for the user's products without requiring the user to search for or locate the content. Likewise, the product support server automatically serves the latest product support content to the client whenever it becomes available.

In one embodiment, a product that is purchased as a used item is added to the personal inventory of a user. This item is stored in the database repository of a cloud server. When a product recall is issued for the product, the cloud server either actively queries the appropriate external information source, or is registered to receive push notifications from the appropriate external information source to obtain the details of the product recall and any information associated with the product recall. This information is then delivered to the user's mobile device client on a substantially real-time basis so the user is promptly alerted to the product recall details.

In one embodiment, the interactive GUI is typically displayed on the user's mobile device client. In addition, or alternatively, an interactive GUI can be displayed to the user on a different device, such as a laptop, PC, or other stationary device. The interactive GUI can take different forms depending on the user device operating system platform on which it is activated, ranging from applications operating on mobile device platforms to web-based browser applications.

In one embodiment, the product support content can be curated from a variety of consumer product support services including conventional and third party product support services. The curated product support content is stored on a product support database accessible by the client using a server of a personal inventory and product support system, or only the hyperlinks to the content are stored in the database. The personal inventory and product support system can proactively curate product support content on behalf of users based on the common product identifiers used by any one or more of the variety of consumer product support services, including conventional and third party product support servers. The personal inventory and product support system also facilitates the accumulation on the product support database of additional content located by users of the client, and curated by the product support system.

In one embodiment, the product support content is automatically curated on behalf of all users by the personal inventory and product support system prior to serving the content to a particular user via the client. Such content can then be downloaded to the client once acquisition or order of the relevant product occurs (or any time a user desires to obtain such content). In addition or alternatively, the product support content can be manually curated by the user by using the client GUI to add new content for personal use and/or to store the content on the personal inventory and product support system for access by other users. In another embodiment, the process of curating content can be a combination of software and manual steps.

In one embodiment, the product support content comprises any one or more of interactive content and non-interactive content, including hyperlinks to content stored outside of the personal inventory and product support system. The interactive content can include various media such as videos or hyperlinked web pages, whereas the non-interactive content can include PDF documents and/or other types of text and graphic files. In one embodiment, the hyperlinks to content stored outside the personal inventory and product support system can include hyperlinks to content stored on non-curated product support servers, such as the branded and third party product support servers.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

FIGS. 7A-12B illustrate examples of the personal inventory and product support app 104 graphical user interface (GUI) implemented on a touch display device 118 as described in accordance with embodiments of the invention. In the illustrated embodiment, the GUI elements are designed in accordance with iOS platform human interface design guidelines. However, the GUI elements could also be designed in accordance with other mobile operating platforms on which the personal inventory and product support app 104 can operate.

A sign in screen 702 provides the user with options to create an account and sign in using various methods such as e-mail, Facebook and Google+. Once signed on, a user options screen 704 provides the user with options to edit personal information, change password, and verify their sign on information. The application "clock" indicator icon and text alerts the user that the app is still awaiting verification. A menu button icon 706 appearing in the screen's navigation bar will activate a sidebar screen 708 to be superimposed over the leftmost portion of the screen to reveal a set of 6 tiled icons that can be used to navigate to the next screen. For example, the SETTINGS icon will take the user back to the user options screen 704.

In FIGS. 8A-C, by activating the MY STUFF icon in the sidebar screen 802 will take the user forward to the mail folders view screen 804. The folder view screen 804 shows all of the named folders in which the user can organize their products. For example, in the illustrated example there are four folders: Phones, Home Computer, Home Appliances, and a default folder named Random Stuff, each with a numeric indicator on the right that shows the number of products in the folder. In this case, each folder contains one product and the default folder is empty.

In the illustrated example, the Home Computer folder is opened to reveal one item representing the one product that the folder contains, in this case an ABC branded computer printer. The appearance of the item in the folder is an indication that the product it represents has been identified and the information stored on the user's product inventory database 110. However, the leftmost indication of an exclamation point (!) informs the user that the product has not been verified against the curated consumer product support database 108, meaning that the model number and/or other identifying information hasn't yet been verified sufficiently to allow the system to obtain curated product support information for the product. A rightmost indication of a network sharing symbol informs the user that the user has elected to share the item's product information with others.

In the illustrated example, the mail folders view screen 804 includes two new navigational icons in the navigation bar: an organizational icon that allows the user to create new folders, and a search icon that allows the user to search through the existing folder names and item names to find particular folders or products. When the folders view screen 804 is activated for the first time, a application icon is displayed at the bottom of the screen to allow the user to quickly access the add new stuff screen 1102 which will be described in further detail below with reference to FIGS. 11A-C.

Returning to FIGS. 8A-C, the user can manipulate the folders and the items contained in the folders using the touch screen interface to swipe away the folders to delete them (if they are empty) and to drag and drop the items representing the products to move them from one folder to another folder. If a folder is tapped it opens to reveal the items it contains and tapped again it closes. An item is tapped to navigate to the item details screen 810, a scrollable screen containing all of the detailed information that may be stored for that product. The item details screens 802, 804 and 810 default to a browsable display, but can be changed to an editing mode display through the activation of the compose icon (the "pencil" icon) appearing in the rightmost area of the navigation bar.

In the illustrated example in FIGS. 8A-C, the brand, product name and model number have already been entered, and the user is presented with four categories of additional details: Retailer, Servicer, Online Content and Parts & Accessories that when activated will jump the user to category-specific screens (see FIGS. 10A-C) when in a browsable mode of display. If the editing mode is selected by activating the compose icon, then the category browsing options disappear and the user can only scroll to the various portions of the data entry screen.

Figure 10C:
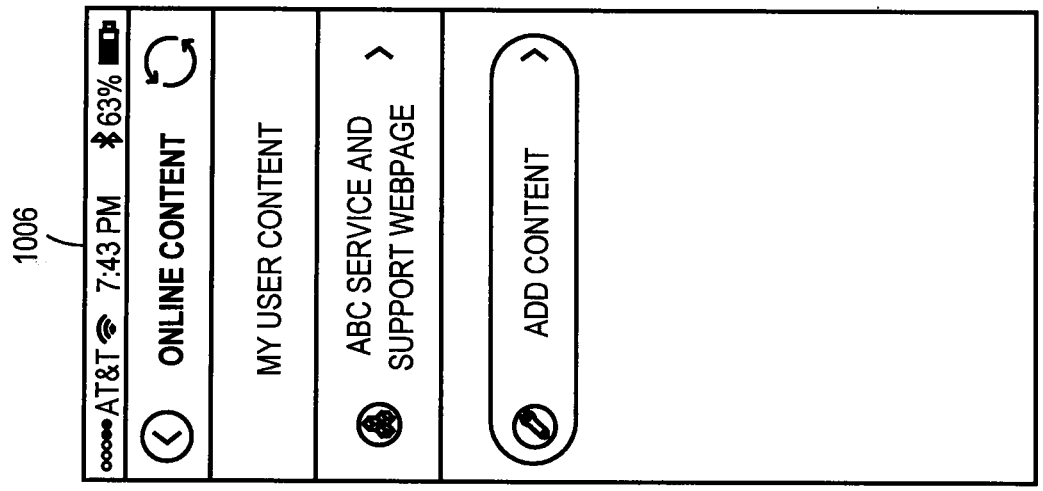
Figure 10B:
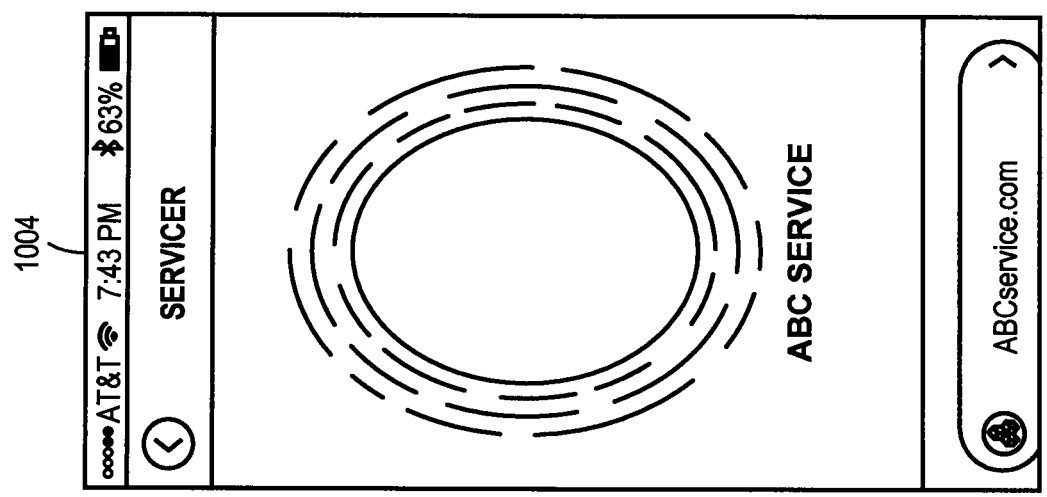
Figure 10A:
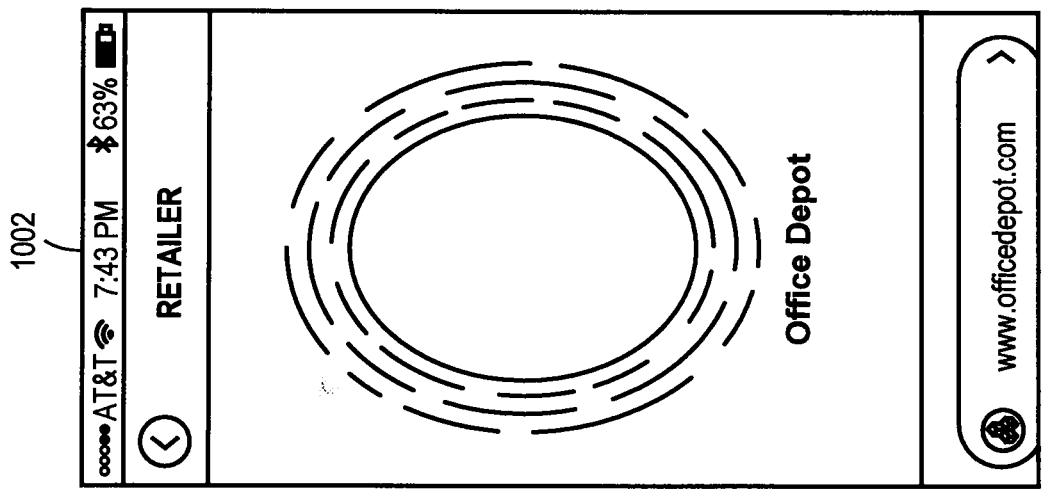
Figure 14C:
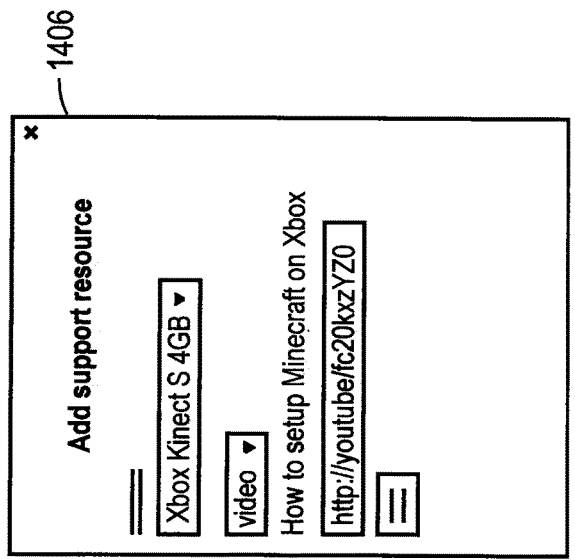
Figure 14D:
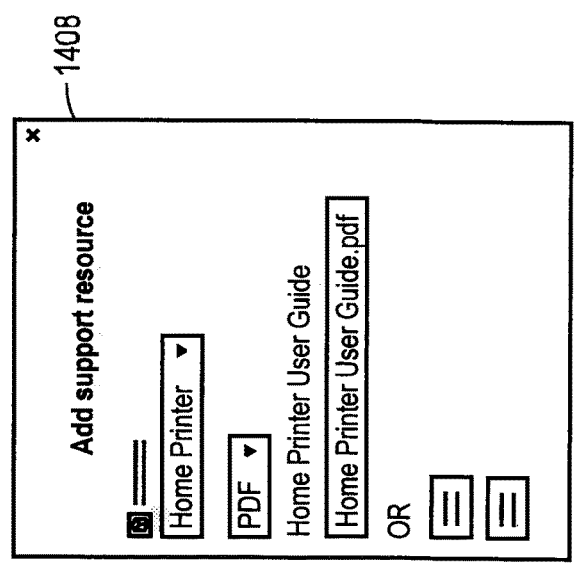
Figure 14A:
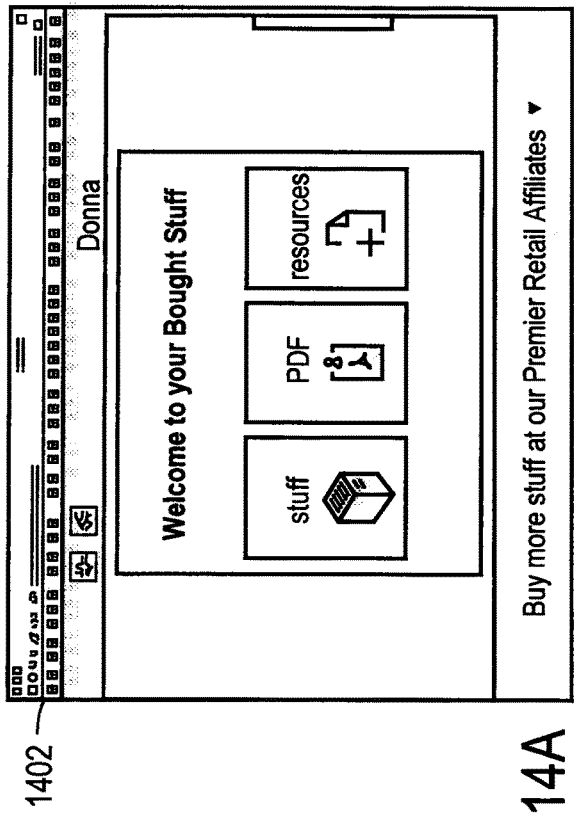
Figure 14B:
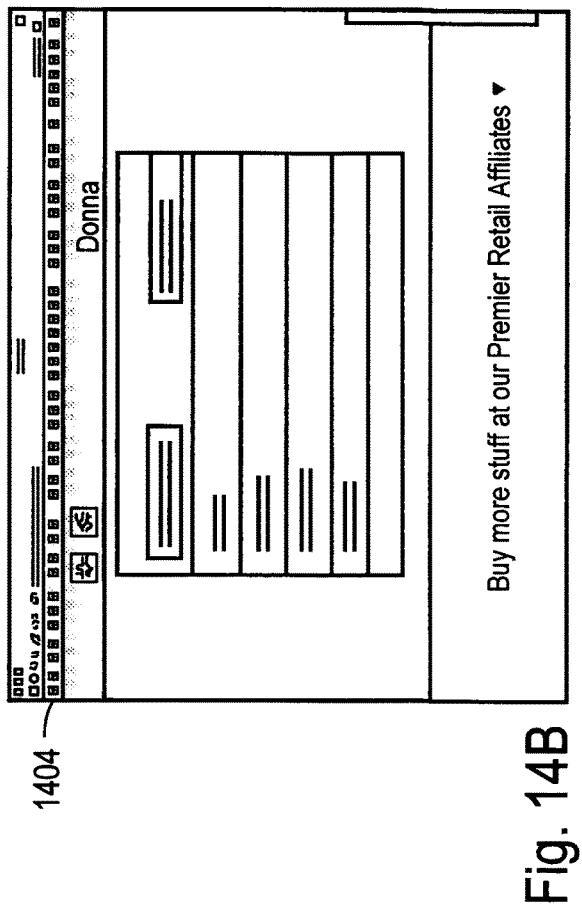

In FIGS. 9A-C, different portions of the scrollable details screen 810 are shown in screens 902, 904 and 906 operating in browsing mode, and in FIGS. 10A-C, the category-specific screens for Retailer 1002 and for Servicer 1004 and for the category of Online Content 1006. Each of these screens is provided with a web-navigation button that will take the user to the specified URL using the device's default browsing application, in this case the Safari application on the iOS platform. In addition, the Online Content screen 1006 is provided with an Add Content tool button to add more product specific content. In one embodiment, activating the Add Content button on screen 1006 will launch the browser-based personal inventory and product support app 104, in which the user is able to add links to different types of product support. Examples of the browser-based personal inventory and product support app 104 are shown in FIGS. 14A-15C.

In FIGS. 11A-C, two views of an Add New Stuff screen 1102 and 1104 is shown in which the user is prompted to enter basic identifying information about the product, such as a photo of the product and a name of the product. As shown, one option for entering the information quickly is to prompt the user to scan a product-specific code that identifies the product, such as the UPC code or the serial number associated with the product. An accurate scan of a recognizable code will trigger the personal inventory and product support system 102 to retrieve all of the relevant information from a branded or third party support server 124/122, and to import the information into the user/product inventory database 110 and the product support content database 108 for this item.

The scanning method of entry eliminates the necessity of having the user enter the information manually. However, in some instances entering the information manually may be necessary if there is no scan-able information detected by the scanner or if the scan-able information is not recognizable in the existing branded or third party support servers 124/122. Instead the user is provided with one or more manual data entry screens such as that shown in screen 1104 that prompt the user to enter the information in pull-down entries in which the information is searched as it is entered to narrow down the possibilities and guide the user to enter the information correctly. For example, if the brand name is recognized, the user may be prompted to select from a series of model numbers associated with the brand name for a particular category of products.

In FIG. 12, another view of an Add New Stuff screen 1202 and corresponding Item Details screen 1204 is shown in which the user is prompted to enter the date of purchase using a date picker wheel control.

In one embodiment, once the information identifying a product is successfully entered as illustrated in FIGS. 11A-C and 12A-B, whether manually or through the use of scanning, an item details screen 1106 is displayed to the user with an indication that the product support information has been connected to a corresponding entry in the curated product support content database 108. This means that the user will be able to access whatever curated product support content is available for that product.

FIGS. 13A-13B.3 illustrate an examples of a personal inventory report generated in the personal inventory and product support system as described in accordance with embodiments of the invention. The personal inventory report 1302, an example of which is shown in FIG. 13A, is typically generated on demand in response to a user request. The report typically includes the identifying product information, such as the user title, brand, product name, model number, and serial number, as well as the purchase date and price and the product's location. The personal inventory report is designed to be used for insurance or other record-keeping purposes.

In one embodiment the user is prompted to request the report upon activation of the personal inventory and product support application 104 on a device. For example, with reference to FIGS. 8A-C, by activating the EMAIL ME MY STUFF icon in the sidebar screen 802 will immediately generate a PDF document with the user's entire personal product inventory and send it to the email address associated with the account.

With reference to FIGS. 13B.1-13B.3, another example of a user interface for obtaining a personal inventory report is illustrated. Specifically, FIGS. 13B.1-13B.3 illustrates a browser-based GUI of the personal inventory and product support app 104 operating on a mobile device platform in which the user is prompted to "Get selected assets as a PDF" in an "All stuff" web page 1306 that, when activated, will prompt the user in a pop-up window 1308 to select from a detail or summary layout of the personal inventory report, and provide the user with the option of downloading the report to her device or sending the report to an email address associated with the account or an alternate email address.

In the illustrated example, when selecting the option of downloading the report, the user is provided with additional options in window 1310 to open 1312 the downloaded report in an app on the user's mobile device, such as the iBooks app operating on an iPhone user mobile device. In window 1314, the inventory report is displayed in the iBooks app, for example, with the label "boughtstuff_assets" and can be viewed, bookmarked, and manipulated the same as any other document in iBooks. Note in the illustrated example of FIGS. 13B.1-13B.3, the personal inventory report further includes photos of the inventoried items, where the user-selected photos of the item were uploaded by the user when adding or editing the item into the personal inventory and product support system 102.

FIGS. 14A-15C, illustrate examples of the personal inventory and product support app 104 graphical user interface (GUI) implemented in a browser platform operating on any client device 118/120 capable of supporting a browser platform as described in accordance with embodiments of the invention. In the illustrated embodiment, a welcome web page 1402 is displayed with options to browse the user's "stuff," referring to the user's products that have been stored in the user/product inventory database 110 of the product support server 106. Other options include the above-described option to email a personal inventory report to the user. The user is also provided with the option to add more resources. Once activated, this option will cause a pop-up entry window 1406 to appear on the user interface to prompt the user to select which product the resource is for, and the type and location of the resource. For example the user may indicate the resource is a PDF formatted user manual that is located at a particular URL or file pathname, or that the resource is a how-to video located at a particular URL address.

In one embodiment, the user may create their own video content stored, for example, locally on their device 118/120 in storage 308. The pop-up entry window 1406 can prompt the user to select the locally stored video content for upload to the user's personal inventory data stored in the user product inventory database 110 in the personal inventory and product support system 102. The server 106 can then, in turn, curate the uploaded video and, if appropriate, store the video on the curated product support database 108 in preparation for serving the curated user-supplied video content to other authorized users in accordance with the user's permissions and preferences.

FIGS. 15A-C illustrates a set of screens similar in function to those in FIGS. 14A-D, but that have been designed for use on either a mobile or stationary device's browser interface. The screens 1502, 1504 and 1506 are designed using a tabbed UI that specifies a Stuff tab in 1502, a Support tab in 1504, and a Share tab in 1506. In the Stuff tab the user is able to browse the product details, while in the Support tab the user is able to view the curated product support content that is currently available for the product, as well as to enter additional resources that can be added to the curated support content for this product. The Share tab allows users to share links to web pages or other information about the products that are in their product inventory database.

FIGS. 16A.1-16C.2 illustrate additional examples of the client GUI implemented in a browser-based platform operating on a personal computing device. In these examples, similar to those illustrated in FIGS. 15A-C, the screens 1602, 1604, 1606, 1608, 1610, 1612 and 1616 are designed using a tabbed UI that specifies a Stuff tab in 1602, a Retailer tab in 1604, a Servicer tab in 1606, a Support tab in 1608, a Parts and Accessories tab in 1610 and a Share tab in 1612 and 1616. The client GUI automatically displays the additional tabs for the Retailer 1604, Servicer 1606, and Parts and Accessories 1610 for those products in the user's personal inventory for which such information is available.

As in the client GUI illustrated in FIGS. 15A-C, in the Stuff tab 1602 in FIGS. 16A.1-A.3, the user is able to browse the product details. In the Retailer 1604 and Servicer 1606 tabs, the user is able to browse and hyperlink directly to the retailer from which the product was acquired and any online servicer information that may be available for the product. With reference to FIGS. 16B.1-B.2, as in FIGS. 15A-C, in the Support tab 1608 the user is able to view the curated product support content that is currently available for the product, as well as to enter additional resources that can be added to the curated support content for this product (where the entry of the additional resources may be carried out as described in further detail with reference to FIGS. 14A-D). The Parts and Accessories tab 1610 enables the viewer to browse the various parts and accessories that are available for the product with links, when available, to the retailers from which the parts and accessories may be purchased.

With reference to FIGS. 16C.1-C.2, as in FIGS. 15A-C, the Share tab 1612 and 1616 allows users to share links to web pages or other information about the products that are in their product inventory database. In the illustrated example, the user is provided with a button labeled "Start sharing this asset" 1614 that, when activated, provides the user with the shortened URL 1618 generated for the asset information stored in the personal inventory and product support system 102, and the ability for the user to copy that shortened URL to send it other with whom the user wishes to share the information.

Figure 17:
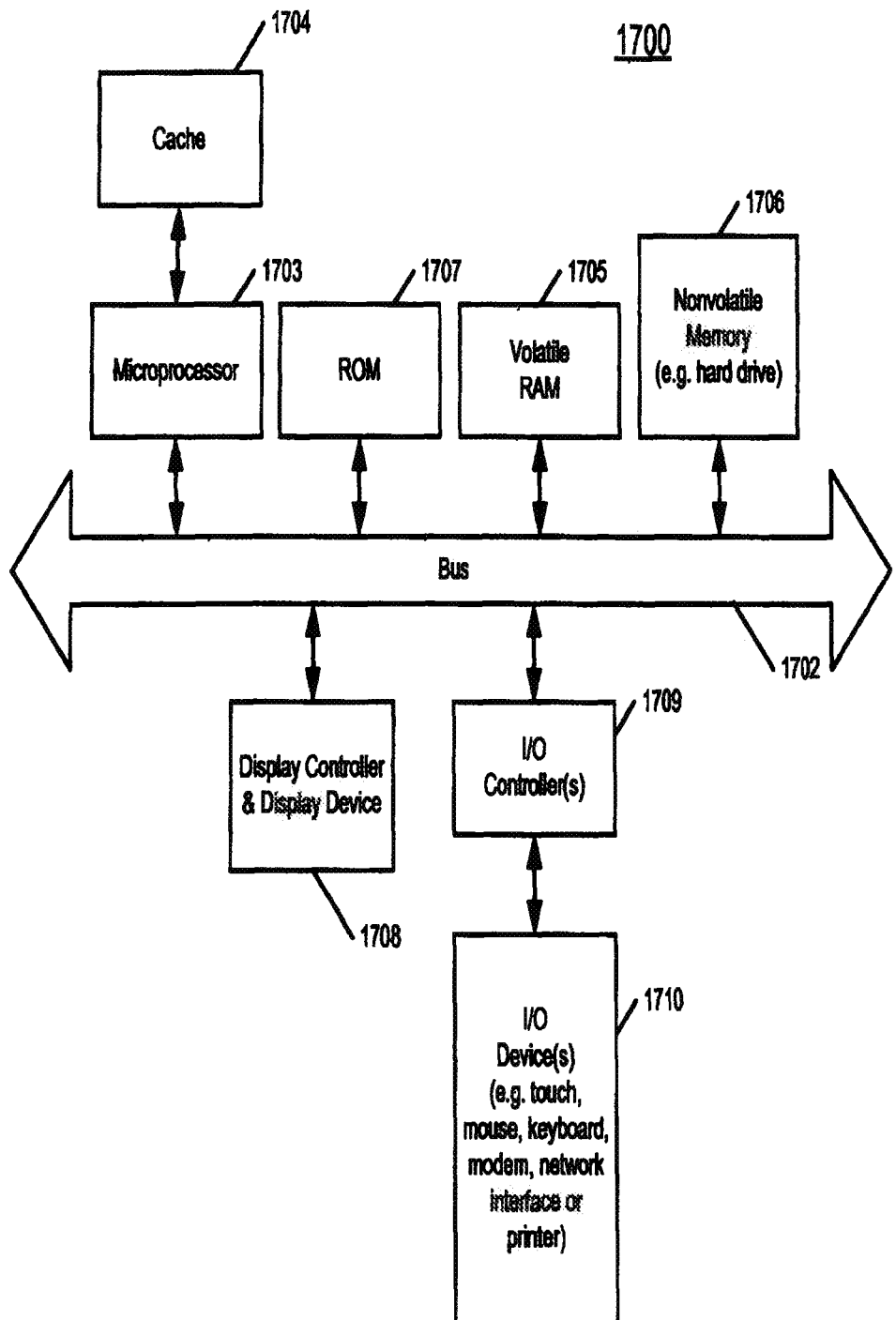
FIG. 17 is a block diagram overview of a computer system or device which may be used with an embodiment of the invention.

FIG. 17 is a block diagram overview of a computer system or device that may be used with one embodiment of the invention. For example, the system 1700 may be used as a client or a server as shown in FIG. 1. Note that while FIG. 17 illustrates various components of a computer system or device, it is not intended to represent any particular architecture or manner of interconnecting the components; as such details are not germane to the present invention. It will also be appreciated that network computers, various types of user devices, including hand-held computers, mobile devices, cell phones, tablets and other data processing systems, any of which may have fewer components or perhaps more components than illustrated in FIG. 17, may also be used with embodiments of the present invention.

As shown in FIG. 17, the computer system 1700, which is a type of a data processing system, includes a bus or interconnect 1702 which is coupled to one or more microprocessors 1703 and a ROM 1707, a volatile RAM 1705, and a non-volatile memory 1706. The microprocessor 1703 is coupled to cache memory 1704. The bus 1702 interconnects these various components together and also interconnects these components 1703, 1707, 1705, and 1706 to a display controller and display device 1708, as well as to input/output (I/O) devices 1710, which may be mice, keyboards, modems, network interfaces, printers, and other devices that are well-known in the art.

Typically, the input/output devices 1710 are coupled to the system through input/output controllers 1709. The volatile RAM 1705 is typically implemented as dynamic RAM (DRAM) that requires power continuously in order to refresh or maintain the data in the memory. The non-volatile memory 1706 is typically a magnetic hard drive, a magnetic optical drive, an optical drive, or a DVD RAM or other type of memory system that maintains data even after power is removed from the system. Typically, the non-volatile memory will also be a random access memory, although this is not required.

While FIG. 17 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1702 may include one or more buses connected to each other through various bridges, controllers, and/or adapters, as is well-known in the art. In one embodiment, the I/O controller 1709 includes a USB (Universal Serial Bus) adapter for controlling USB peripherals. Alternatively, I/O controller 1709 may include an IEEE-1394 adapter, also known as FireWire adapter, for controlling FireWire devices.

Embodiments of the invention also relate to an apparatus for performing the operations herein, such as a computer program that is stored in a non-transitory computer or machine-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to update a product configuration for a product comprising:
   receiving, using a camera of a user device, visible light transmitted from the product, the visible light comprising diagnostic information indicative of the product, the user device comprising the camera; a processor coupled to the camera, and a flash light source coupled to the processor;
   sending, using the processor, the diagnostic information to a remote location;
   receiving, using the processor, one or more commands over a network connection based on the diagnostic information; and
   transmitting, using the flash light source of the user device, pulsing light to the product, the pulsing light comprising the one or more commands for the product to execute to update the product configuration.

2. The method of claim 1, wherein the visible light is generated by one or more light emitting diodes (LEDs) on the product.

3. The method of claim 1, wherein the one or more commands are to be received by an optical receiver of the product and executed by the product to address a problem associated with the product that is indicated by the diagnostic information.

4. The method of claim 1, wherein the remote location comprises a call center communicably coupled to the user device over the Internet.

5. The method of claim 1, wherein the diagnostic information is received from the product using a short-range wireless optical communication system.

6. The method of claim 1, wherein the diagnostic information is collected by the product and includes one or more indicators associated with a failure of the product.

7. The method of claim 1, wherein the remote location is over a network.

8. A non-transitory machine-readable medium storing executable instructions which cause a user device comprising a camera, a processor coupled to the camera, and a flash light source coupled to the camera, to perform a method to update a product configuration for a product comprising:
   receiving, using the camera, visible light transmitted from the product, the visible light comprising diagnostic information indicative of the product;
   sending, using the processor, the diagnostic information to a remote location;
   receiving, using the processor, one or more commands over a network connection based on the diagnostic information; and
   transmitting, using the flash light source, pulsing light to the product, the pulsing light comprising the one or more commands for the product to execute to update the product configuration.

9. The non-transitory machine-readable medium of claim 8, wherein the visible light is generated by one or more light emitting diodes (LEDs) on the product.

10. The non-transitory machine-readable medium of claim 8, wherein the one or more commands are to be received by an optical receiver of the product and executed by the product to address a problem associated with the product that is indicated by the diagnostic information.

11. The non-transitory machine-readable medium of claim 8, wherein the remote location comprises a call center communicably coupled to the user device over the Internet.

12. The non-transitory machine-readable medium of claim 8, wherein the diagnostic information is received from the product using a short-range wireless optical communication system.

13. The method of claim 8, wherein the diagnostic information is collected by the product and includes one or more indicators associated with a failure of the product.

14. The method of claim 8, wherein the remote location is over a network.

15. A device to update a product configuration for a product comprising:
   a camera;
   a processor coupled to the camera; and
   a flash light source coupled to the camera,
   wherein the processor is configured to:
      receive, using the optical receiver, visible light transmitted from the product, the visible light comprising diagnostic information indicative of the product;
      send, using the processor, the diagnostic information to a remote location;
      receive, using the processor, one or more commands over a network connection based on the diagnostic information;
      transmit, using the flash light source pulsing light to the product, the pulsing light comprising, the one or more commands for the product to execute to update the product configuration.

16. The device of claim 15, wherein the visible light is generated by one or more light emitting diodes (LEDs) on the product.

17. The device of claim 15, wherein the one or more commands are to be received by an optical receiver of the product and executed by the product to address a problem associated with the product that is indicated by the diagnostic information.

18. The device of claim 15, wherein the remote location comprises a call center communicably coupled to the mobile device over the Internet.

19. The device of claim 15, wherein the diagnostic information is received via a short-range wireless optical communication system communication.

20. The device of claim 15, wherein the diagnostic information is collected by the product and includes one or more indicators associated with a failure of the product.

* * * * *